United States Patent
Fujita et al.

(10) Patent No.: US 7,312,552 B2
(45) Date of Patent: Dec. 25, 2007

(54) ROTARY ELECTRO-DYNAMIC MACHINE AND ARMATURE WINDING THEREOF

(75) Inventors: Masafumi Fujita, Yokohama (JP); Tadashi Tokumasu, Tokyo (JP); Yasuo Kabata, Yokohama (JP); Masanori Arata, Yokohama (JP); Mikio Kakiuchi, Yokohama (JP); Susumu Nagano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 11/240,567

(22) Filed: Oct. 3, 2005

(65) Prior Publication Data

US 2006/0071573 A1 Apr. 6, 2006

(30) Foreign Application Priority Data

Oct. 5, 2004 (JP) ............... 2004-293051

(51) Int. Cl.
*H02K 1/00* (2006.01)
(52) U.S. Cl. .............. 310/216; 310/209; 310/213
(58) Field of Classification Search ........... 310/179, 310/184, 209–216
See application file for complete search history.

(56) References Cited

U.S. PATENT DOCUMENTS

| | | | | |
|---|---|---|---|---|
| 3,825,783 A | * | 7/1974 | Duffert | 310/213 |
| 5,821,652 A | * | 10/1998 | Hyypio | 310/83 |
| 6,566,778 B1 | * | 5/2003 | Hasegawa et al. | 310/211 |
| 6,608,419 B2 | * | 8/2003 | Shah et al. | 310/216 |
| 6,703,752 B2 | | 3/2004 | Haldemann | |
| 6,713,930 B2 | * | 3/2004 | Shah et al. | 310/216 |
| 7,109,626 B2 | * | 9/2006 | McClelland et al. | 310/216 |
| 2003/0201689 A1 | * | 10/2003 | Shah et al. | 310/216 |

FOREIGN PATENT DOCUMENTS

| JP | 58-14141 | 3/1983 |
|---|---|---|
| JP | 2002-78265 | 3/2002 |

OTHER PUBLICATIONS

O. Fluhr, et al., "Air-Cooled Turbo-Generators for 18-130 MVA, Types WX and WY", Brown Boveri Review 6-76, pp. 392-398, no date provided.

Xu Shanchun, et al., "A New Transposition Technique of Stator Bars of the Hydrogenerator", Proceedings of International Symposium on Salient-Pole Machines with Particular Reference to Large Hydro-Electric Generators and Synchronous Motors, Oct. 1993, pp. 384-389.

* cited by examiner

*Primary Examiner*—Thanh Lam
(74) *Attorney, Agent, or Firm*—Oblon, Spivak, McClelland, Maier & Neustadt, P.C.

(57) ABSTRACT

Sub core sections are arranged at the end portions and the center portion of a stator core, and strand conductors are twisted and transposed by 360 degrees continuously toward the extending direction of winding slot. The length corresponding to transposition pitch 180 degrees of the strand conductors of the stator core is set as one core unit area, the sub core sections including portions whose space factors are different are arranged such that the sum of voltages in the strands induced in the strand conductors in the odd-numbered core unit area from one end portion of the stator core offsets the sum of voltages in the strands induced in the strand conductors in the even-numbered core unit area from the end portion of the core.

5 Claims, 23 Drawing Sheets

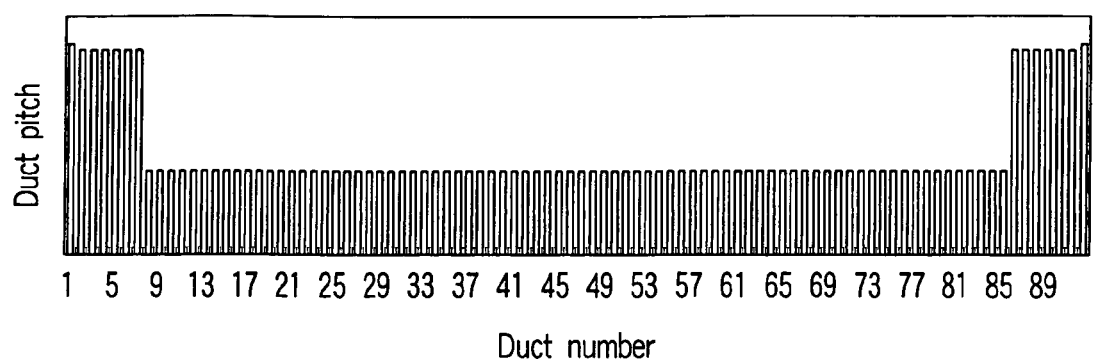
F I G. 25
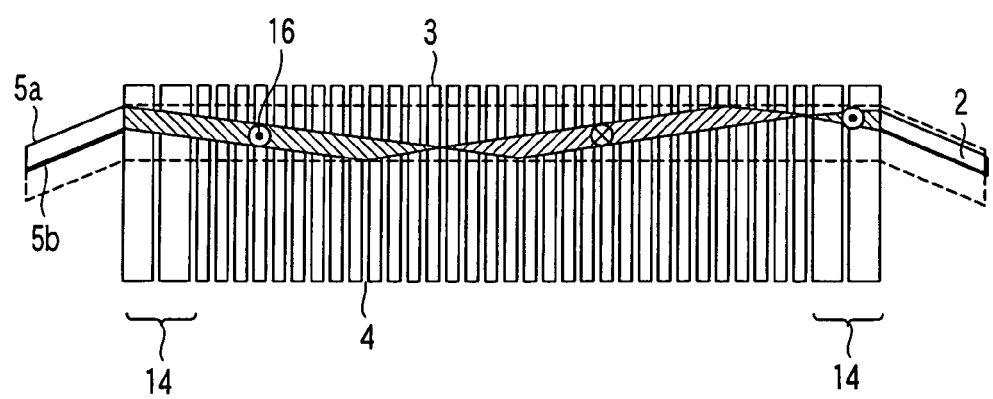
F I G. 26
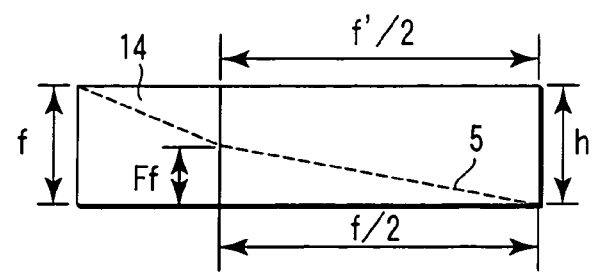
F I G. 27

ROTARY ELECTRO-DYNAMIC MACHINE AND ARMATURE WINDING THEREOF

CROSS-REFERENCE TO RELATED APPLICATIONS

This application is based upon and claims the benefit of priority from prior Japanese Patent Application No. 2004-293051, filed on Oct. 5, 2004, the entire contents of which are incorporated herein by reference.

BACKGROUND OF THE INVENTION

1. Field of the Invention

The present invention relates to a rotary electro-dynamic machine and an armature winding thereof.

2. Description of the Related Art

A rotary electro-dynamic machine according to the prior art, as shown in a cross sectional view in FIG. 42, is constituted by a stator core 3 in which a winding slot 10 extending along the rotating shaft of a rotor, an armature winding 2 including an upper coil 2c and a lower coil 2d respectively constituted by many strand conductors 5 buried and piled in the winding slot 10, and plural ventilating ducts arranged in the radial direction in the stator core 3. The strand conductors 5 are formed so as to be twisted and transposed by 360 degrees continuously toward the extending or longitudinal direction of the winding slot 10 at a portion stored in the winding slot 10, and the strand conductors 5 are short-circuited at the ends of the armature winding 2 which protrude outward from the sides of the stator core 3.

When AC current flows through multiple strand conductors of such a configuration, a leakage magnetic flux that crosses the winding slot 10 in the circumferential direction occurs, thereby a voltage caused by EMF is induced to between the strand conductors 5 at each portion of the multiple strand conductors in the longitudinal direction. If, in a pair of strand conductors, there occurs an extremely large difference in the induced voltages of respective strand conductors in the entire length of the strand conductors, large circulating currents flow into the closed-loop shaped pair of strand conductors, so that current loss increases and heat which is generated inside of the strand conductors also increases.

Accordingly, in order to make almost same the voltage that is induced between the strand conductors over the entire length of the strand conductors and to prevent the circulating currents from flowing, the strand conductors are transposed by various methods.

Herein, with reference to FIGS. 43 and 44, transposition of strand conductors in the prior art will be explained. The transposition of strand conductors is made by twisting strand conductors along the extending direction of coil slot, and sequentially changing the rotational positions of the respective strand conductors. In the cross section of the strand conductors, a certain strand conductor is considered to move in a circular pattern around the center of the conductor cross section, and the transposition degree is expressed by the rotational angle thereof. The transposition where the respective strand conductors pass all the positions in the strand conductor cross section and get back to the same positions as those at which they have started at the opposite end of the winding slot is referred to as a 360-degree transposition.

FIG. 43 is a schematic diagram showing a strand configuration of a 360-degree transposition, and it is constituted by a stator core 3 in which plural winding slot extending along the rotating shaft center of an rotor (not shown), an armature winding 2 constituted by many strand conductors 5 buried and piled in the winding slot, and plural ventilating ducts 4 arranged in the radial direction in the stator core 3. The strand conductors 5 are formed so as to be twisted and transposed by 360 degrees continuously toward the extending direction of the winding slot at a portion stored in the winding slot, and the strand conductors 5 are short-circuited at the ends of the armature winding 2 which protrude outward from the sides of the stator core 3.

FIG. 43 shows a magnetic flux that cross between two representative strand conductors 5a and 5b. In the figure, crossing magnetic fluxes in the core section 3 are shown as 16a to 16c, and for example, the sum of fluxes 16a and 16c becomes equal to the flux 16b, and the induced voltage between the strand conductors 5a and 5b by the magnetic fluxes that cross in the winding slot is offset.

However, the 360-degree transposition has been applied in the winding slot, but has not been made outside the winding slot. Accordingly, there occurs unbalanced voltage due to leakage magnetic fluxes 16x and 16y at the end portions of the rotary electro-dynamic machine, and there occur circulating currents in the strand conductors 5a and 5b.

As described above, since there are leakage magnetic fluxes at the slot end portion of such a rotary electro-dynamic machine, voltage is induced to the end portion of strand conductors, and circulating currents flow into the strand conductors and a current loss occurs. In order to reduce this loss, it is only necessary that the rotational positions or phases of the strand conductors at the end portions of the strand conductors are reversed, and that the directions of the respective voltages induced at the end portions of the same strand conductor are reversed so as to offset them. This is realized by a 540-degree transposition, i.e., one-and-half-turn transposition of the strand conductors in the winding slot.

FIG. 44 is a schematic diagram showing a strand configuration for a 540-degree transposition, and the same functional components as those shown in FIG. 43 are denoted by the same reference numerals, and the duplicated description thereof is omitted.

In FIG. 45, the transposition pitch in the area of ¼ of the core length from the end portions becomes a half of that at the center portion, namely, in the area of ¼ of the core length from the end portions and in the area of ½ of the core length at the center portion, a 180-degree transposition has been applied respectively. The sum of the crossing magnetic fluxes 16a and 16e between the strand conductors 5a and 5b becomes equal to 16c, and the sum of 16b and 16f becomes equal to 16d, so that the induced voltage between the strands 5a and 5b is offset in the winding slot. The crossing magnetic fluxes 16x and 16y are also offset each other outside the winding slot, it is possible to reduce the circulating currents due to leakage magnetic fluxes at the end portions of the strand conductors.

Besides, it is possible to reduce unbalanced voltage due to leakage magnetic fluxes at the end portions by a 450-degree transposition, and in principle a transfer of 360+90n degrees may be considered, while n is an integer other than 0.

Further, there is disclosed another prior art in which transition intervals of conductive strands are made uneven in a slot, and a portion transposed positionally in the circumferential direction and the radial direction and a portion not transposed are arranged to generate an unbalanced voltage in the conductive strands in the slot, so that unbalanced voltage that occurs in the conductive strands outside of the slot is compensated by the unbalanced voltage (refer to a prior art document 1: Jpn. Pat. Appln. KOKOKU Publication No. 58-14141).

In the invention of this document 1, since a portion not transposed is arranged in slot, the transposition pitch becomes short, and thus, there has been possibility that insulation of strand conductors may be broken, and the strand conductors may be short-circuited.

Moreover, there is disclosed still another prior art document 2 in which, in order to improve the problem with the first example, strand conductors are formed so as to be twisted and transposed continuously toward the extending direction of slot except both the end portions, the thicknesses thereof in the piling direction are made different, and strand conductors are arranged such that thick strand conductors arranged in the radial direction from the rotational center of the rotor at the end portions occupy the area closer to the rotor (refer to the prior art document 2: Jpn. Pat. Appln. KOKAI Publication No. 2002-78265).

On the other hand, there is a case where, in order to offset the leakage magnetic fluxes at the end portion side as shown in FIG. 43, the transposition angle is made slightly below or above the above-mentioned 360+90n degrees. In this case, normally, the transposition angle is determined such that the sum of the circulating current loss due to the induced voltage by the leakage magnetic fluxes at the end portion side, and the circulating current loss due to the induced voltage by the crossing magnetic fluxes in the winding slot becomes to a small value.

Next, cooling gas ventilation routes in a machine will be explained with reference to FIG. 45. FIG. 45 is a basic configuration example of cooling gas ventilation routes in a rotary electro-dynamic machine such as a turbine power generator.

The stator core of the rotary electro-dynamic machine, in which punched iron core plates are laminated, and inside interval pieces are inserted at a specified interval, forms a radial ventilation duct. The ventilation duct is divided into one or more sections in the axial direction, and separated into an air supply section that flows air from the outer peripheral side of the core to the inner side and an air exhaust section that flows from the inner side to the outer peripheral side. FIG. 45 shows a configuration example in which the stator core 3 is divided into two air supply sections 4a and three air exhaust sections 4b.

Cooling gas or air is supplied by a rotor fan 11 attached at ends of the rotor, and branched into three directions to a rotor 1, an air gap 9 and an armature winding end portion 2b.

The supply of the cooling gas to the stator is made from the ventilation route that flows from the fan 11 directly to the air gap 9, and by guiding cooling gas that has cooled the armature winding end portion 2b to the air supply sections 4a of the stator core 3.

The cooling gas supplied to the air supply sections 4a flows through ventilation ducts from the outer side to the inner side, and cools down the stator core 3 and the armature winding 2, and is then conducted to the air gap 9. In the air gap 9, the cooling gas that flows from the fans 11 directly into the air gap joints together with the exhaust gas from the rotor 1, and further flows through the air exhaust sections 4b from the inner side to the outer side, cools down the stator core 3 and the armature winding 2, and interflows at the outer side of the stator. The cooling gas that has cooled the stator and the rotor and become hot goes through a water cooling gas cooler 12 to be cooled down, and goes through air channels back to the rotor fans 11.

The temperature upper limits of the armature winding and the magnetic field winding are strictly limited according to the heat resistance performances of insulating materials that configure the armature winding and the field winding. In the design of the rotary electro-dynamic machine, it is necessary to design such that these temperatures are kept at the rated values or less.

In order to efficiently cool the armature winding, it is preferable to supply less cooling gas to portions whose winding temperatures are low and to intensively supply cooling gas to portions whose winding temperatures are high, thereby to equalize the winding temperatures.

As one of means for adjusting the supply amount of cooling gas, there is a method in which stator core ducts are arranged at uneven pitches in the axial direction. By way of example, a configuration example of a stator core in which ventilating ducts are arranged at uneven pitches is shown in FIG. 46.

Since the cooling gas that flows from the stator end portion into the air gap is supplied directly from the fans, the temperature thereof is lower than temperatures at other portions and is advantageous for cooling. Accordingly, the ventilating ducts 4 at the core end portion have been arranged at a larger pitch than that at other portions.

Further, the temperature of the cooling gas in the air supply sections is lower than that in the air exhaust sections, and thus, the duct pitch of the air supply sections is arranged larger than that of the air exhaust sections in some cases.

When, in the above-mentioned electro-dynamic machine and the armature winding thereof, the ventilating ducts of the stator are distributed unevenly in the axial direction, the distribution of the leakage magnetic fluxes that occur in the core section becomes uneven in the axial direction, and the balance between the magnetic fluxes that cross among strand conductors is lost. Therefore, there occurs unbalanced voltage among conductive strands, and circulating currents occur, and as a consequence, a loss distribution is caused in the conductive strands, and the conductors are subject to local overheat, which has been a problem in the prior art.

BRIEF SUMMARY OF THE INVENTION

According to a first aspect of the present invention, there is provided a rotary electro-dynamic machine comprising, a rotor to which a rotating shaft is rotatably supported; a stator core in which a plurality of winding slots each extending along the axis of the rotating shaft of the rotor is arranged and plural ventilating ducts are arranged in a radial direction, and an armature winding constituted by a plurality of strand conductors stored and piled in each of the winding slots, the strand conductors being formed so as to be twisted and transposed continuously toward the extending direction of the winding slot at a portion stored in the winding slot, and the strand conductors being short-circuited at the ends of the armature winding which protrude outward from the sides of the stator core, wherein the length of the stator core corresponding to transposition pitch 180 degrees of the strand conductors is set as one core unit area, and a sub core section is provided, the sub core section including portions having different space factors such that the total sum of inter-strand voltages induced in the strand conductors in the odd-numbered core unit area from one end portion of the stator core offsets the total sum of inter-strand voltages induced in the strand conductors in the even-numbered core unit area from the end portion of the stator core.

According to a second aspect of the present invention, there is provided an armature winding of a rotary electro-dynamic machine in which plural strand conductors which pile up respectively are stored in respective winding slots of a stator core comprising plural ventilating ducts in the radial direction and plural winding slot in the axial direction, the strand conductors being formed so as to be twisted and transposed continuously toward the extending direction of each winding slot at a portion stored in the winding slot, and the strand conductors being short-circuited at the ends of the armature winding which protrude outward from the sides of the stator core, wherein a sub core section is provided with the stator core, the sub core section including portions having different space factors, and the transposition pitch of the strand conductors is changed so as to offset the unbalanced voltage induced in the sub core section.

According to a third aspect of the present invention, there is provided an armature winding of a rotary electro-dynamic machine in which plural strand conductors which pile up respectively are stored in respective winding slots of a stator core comprising plural ventilating ducts in the radial direction and plural winding slots in the axial direction, the strand conductors being formed so as to be twisted and transposed continuously toward the extending direction of each the winding slot at a portion stored in the winding slot, and the strand conductors being short-circuited at the ends of the armature winding which protrude outward from the sides of the stator core, wherein a sub core section is provided with the stator core, the sub core section including ventilating ducts having different duct space factors, and the transposition angle of the strand conductors in the stator core is varied from the transposition angle to minimize the unbalanced voltage in the strands caused by magnetic fluxes crossing in the strands in the core or between the strands in the core and the strands at the end portions of the core when the stator space factor is uniform in the stator core, so as to offset the unbalanced voltage occurring in the strands due to the magnetic reluctance of the stator core, the magnetic reluctance being varied by the sub core section.

According to a fourth aspect of the present invention, there is provided an armature winding of a rotary electro-dynamic machine in which plural strand conductors which pile up respectively are stored in respective winding slots of a stator core comprising plural ventilating ducts in the radial direction and plural winding slots in the axial direction, the strand conductors being formed so as to be twisted and transposed continuously toward the extending direction of each the winding slot at a portion stored in the winding slot, plural transposition pitches of the strand conductors being provided so as to minimize the unbalanced voltage in the strands, and the strand conductors being short-circuited at the ends of the armature winding which protrude outward from the sides of the stator core, wherein sub core sections whose space factors are different are arranged in part of the stator core, and an inflexion point of the transposition pitch of the strand conductors is shifted from the position to minimize the unbalanced voltage in the strands caused by magnetic fluxes crossing the strands in the core or between the strands in the core and the strands at the end portions of the core when the stator space factor is uniform in the stator core, so as to offset the unbalanced voltage occurring in the strands due to the magnetic reluctance of the stator core, the magnetic reluctance being varied by the sub core section.

According to a fifth aspect of the present invention, there is provided an armature winding of a rotary electro-dynamic machine in which plural strand conductors which pile up respectively are stored in respective winding slots of a stator core comprising plural ventilating ducts in the radial direction and plural winding slots in the axial direction, the strand conductors being short-circuited at the ends of the armature winding which protrude outward from the sides of the stator core, wherein a sub core section having different duct space factors of the ventilating ducts is arranged in part of the stator core, and the strand conductors have portions to be twisted and transposed toward the extending direction of the winding slot, and portions not to be transposed at a portion stored in each the winding slot, so as to offset the unbalanced voltage occurring in the strands due to the magnetic reluctance of the stator core, the magnetic reluctance being varied by the sub core section.

According to the present invention, it is possible to provide a rotary electro-dynamic machine and an armature winding thereof that enable to reduce circulating currents among conductive strands due to an uneven distribution of ventilating ducts in a stator, and to suppress local overheat in the armature winding.

BRIEF DESCRIPTION OF THE SEVERAL VIEWS OF THE DRAWING

FIG. 25 is a distribution chart of the ventilating duct pitch in the numerical analysis in FIG. 24;

FIG. 26 is a basic structural diagram showing a rotary electro-dynamic machine according to a seventh embodiment of the invention;

FIG. 27 is a schematic diagram showing one strand conductor in the seventh embodiment of the invention;

DETAILED DESCRIPTION OF THE INVENTION

Embodiments of a rotary electro-dynamic machine and an armature winding thereof according to the present invention will be described in more details with reference to the accompanying drawings hereinafter. First, with reference to FIGS. 47 to 51, the principle of the present invention of occurrence of a loss distribution among conductive strands due to circulating currents will be explained.

Figure 43:
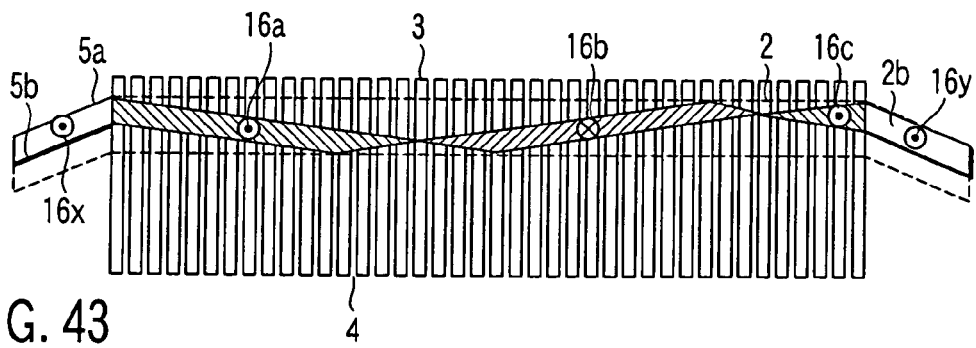
FIG. 43 is a basic structural diagram showing a prior art rotary electro-dynamic machine.
Figure 44:
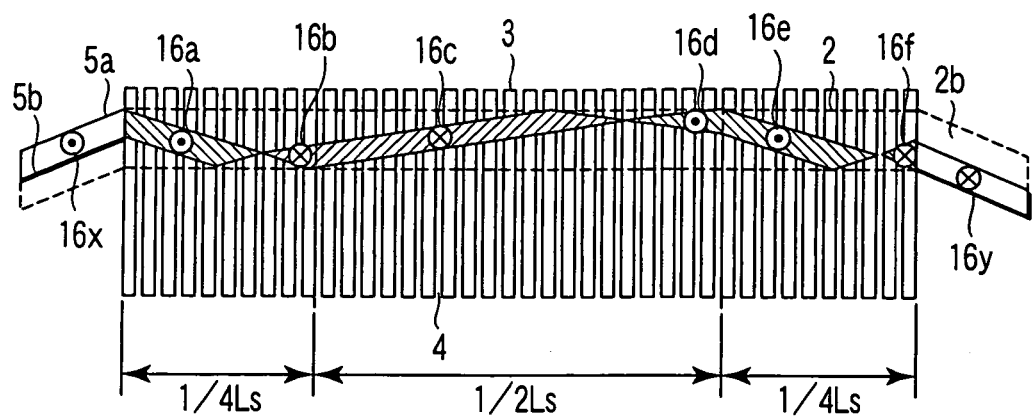
FIG. 44 is a basic structural diagram showing the prior art rotary electro-dynamic machine.
Figure 47:
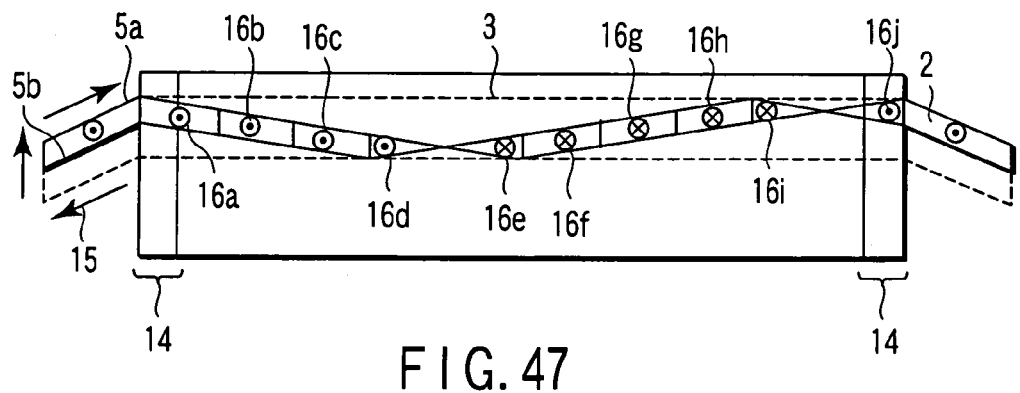
FIG. 47 is a basic structural diagram showing a rotary electro-dynamic machine for explaining the principle of the present invention.
Figure 48:
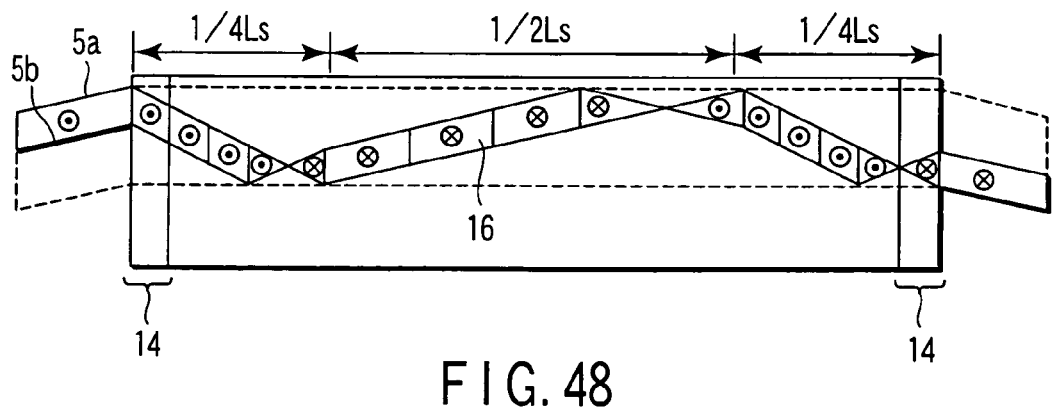
FIG. 48 is a basic structural diagram showing a rotary electro-dynamic machine for explaining the principle of the present invention.

FIG. 47 is a schematic diagram showing the strand configuration and crossing magnetic fluxes in the case of the transposition angle of 360 degrees, and FIG. 48 is that in the case of the transposition angle of 540 degrees. The same functional components as those shown in FIGS. 43 and 44 are denoted by the same reference numerals, and the duplicated description thereof is omitted.

If, in FIG. 47, ventilating ducts are distributed evenly in a stator core, the crossing magnetic fluxes offset each other like the fluxes 16$b$ and 16$g$, and fluxes 16$c$ and 16$h$. However, when sub core sections 14 having a larger space factor than other portions are arranged at end portions as shown in FIG. 47, the crossing magnetic flux 16$a$ becomes larger than the flux 16$f$, and the flux 16$j$ becomes larger than the flux 16$e$. Therefore, magnetic fluxes at portions distant 180 degrees cannot be offset, there occurs unbalanced voltage among the strand conductors 5$a$, 5$b$, and circulating currents 15 flow.

In FIG. 48 in the same manner, the balance of crossing magnetic fluxes is lost by the sub core sections 14 arranged at end portions of the stator core, there occurs unbalanced voltage among the strand conductors 5$a$, 5$b$, and the circulating currents 15 flow.

Figure 49:
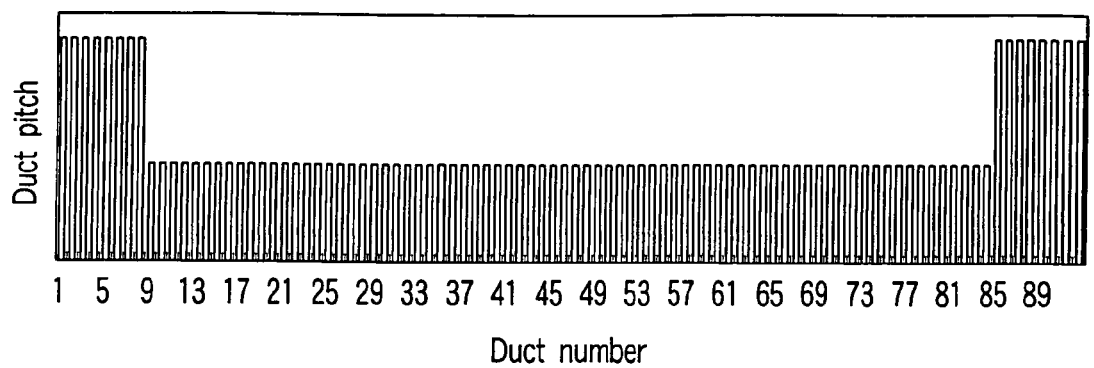
FIG. 49 is a distribution chart of the ventilating duct pitch in the numerical analysis in the rotary electro-dynamic machine in FIG. 47.
Figure 50:
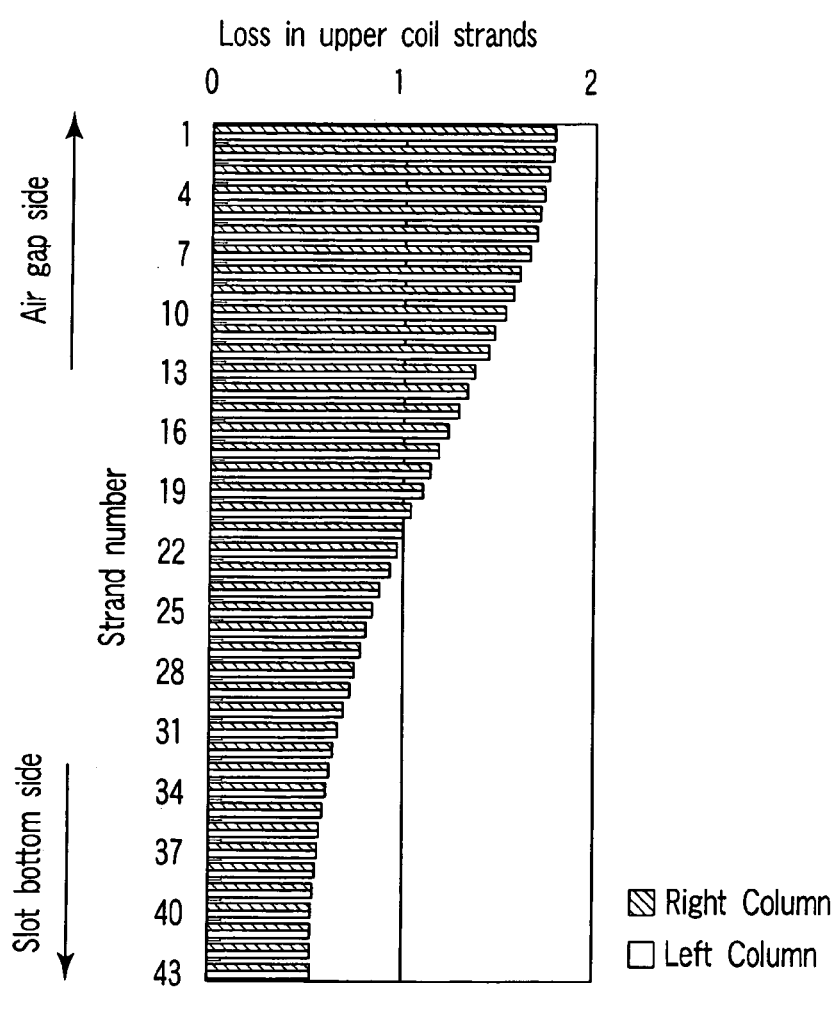
FIG. 50 is a numerical analysis result chart showing a loss distribution in strand conductors in the rotary electro-dynamic machine in FIG. 47.
Figure 51:
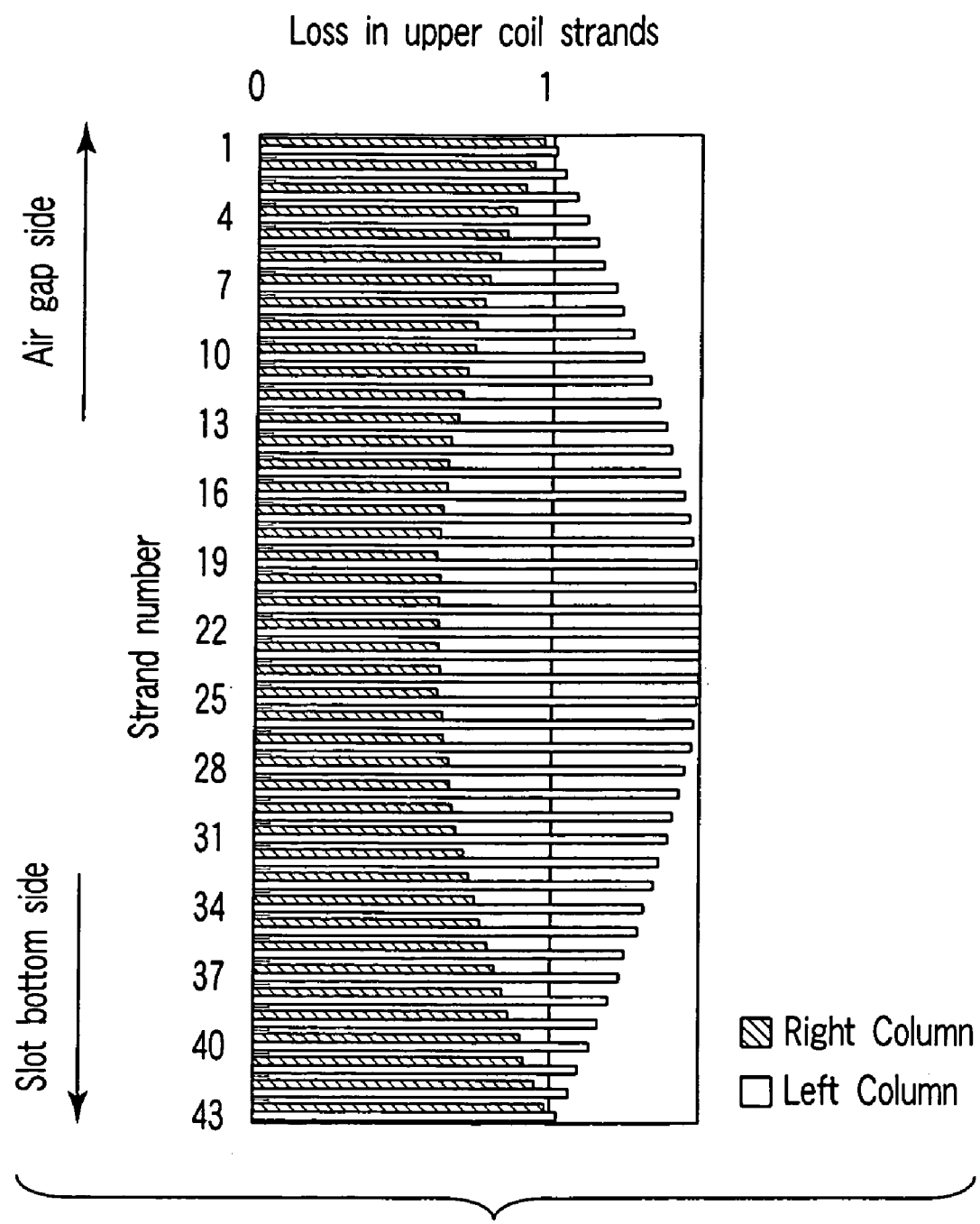
FIG. 51 is a numerical analysis result chart showing a loss distribution in strand conductors in the rotary electro-dynamic machine in FIG. 48.

FIGS. 49 to 51 are examples showing the circulating current loss analysis results by unevenly distributed ducts through numerical analysis in a 150 MVA-class turbine power generator. FIG. 49 shows a distribution of the duct pitch of a stator core in the axial direction of the machine, wherein the abscissa represents duct numbers counted from the end portion, and the ordinate represents duct pitch. FIG.

Figure 42:
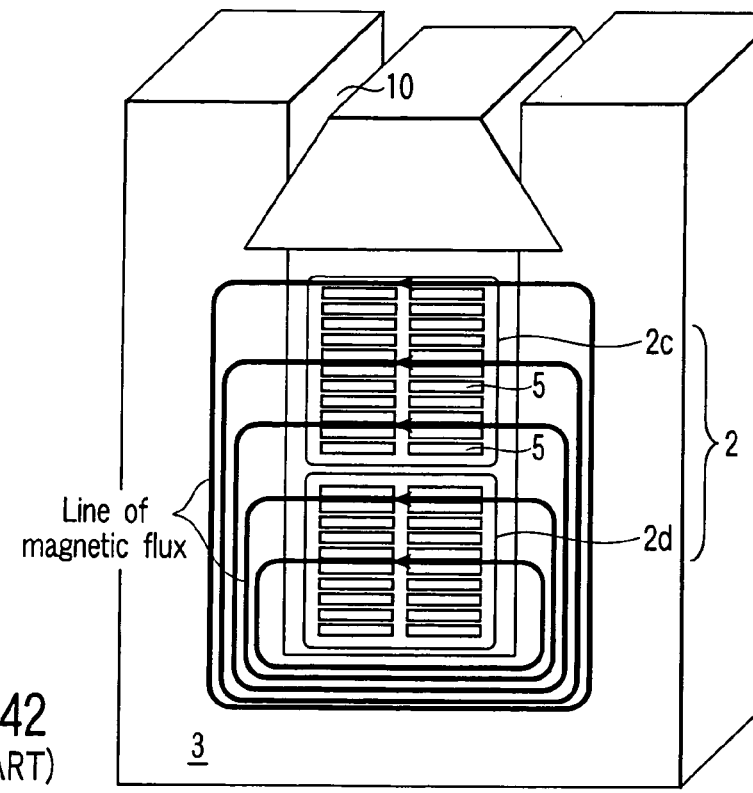
FIG. 42 is a cross sectional view of an armature winding of a rotary electro-dynamic machine and a basic structural diagram showing leakage magnetic fluxes.

50 shows a loss distribution in the case of a 360-degree transposition, and FIG. 51 shows a loss distribution of strands in the case of a 540-degree transposition, wherein the ordinate represents strand numbers counted in the height direction from the air gap side, and the abscissa shows loss in the corresponding strand, and shows losses in the strands at the right side and the strands at the left side in FIG. 42. For simplicity, only the DC loss in coil and circulating current loss due to unevenly distributed ducts have been considered in this analysis, and the DC loss in strands has been set 1 PU.

If the ventilating ducts are distributed evenly in the stator core, the loss distribution in strands should be even. However, in the case where the duct pitch at the end portion is made large, and the space factor is made large, the loss distribution is obtained in which strands at the air gap side become large in the case of the transposition angle of 360 degrees, as shown in FIG. 50.

In the case of the transposition angle of 540 degrees, as shown in FIG. 51, the loss distribution is obtained in which the air gap side and the slot bottom side are equal, but loss becomes large or small at the center portion. In this way, there occurs a loss distribution in conductive strands due to unevenly distributed ventilating ducts, and if cooling conditions are same, there occur a temperature distribution in conductors in this distribution. Note that, in the turbine power generator shown in this example, a 540-degree transposition of strands may be difficult in manufacture. However, herein, shown are the results of a numerical analysis on the same device as a 360-degree transposition, and they do not limit the relation between the capacity and the transposition angle.

First Embodiment

First, a first embodiment will be explained with reference to FIGS. 1 to 6 hereinafter. The embodiment comprises a rotor 1 in FIG. 1, a stator core 3 in which plural winding slots extending along the rotating shaft center of the rotor, an armature winding 2 constituted of many strand conductors buried and piled in the winding slot, and plural ventilating ducts 4 arranged in the stator core in the radial direction.

At the end portions and the center portion of the stator core in the axial direction, sub core sections 14 (14a to 14d) having larger space factor than other stator core sections are provided. Strand conductors 5 are formed so as to be twisted and transposed by 360 degrees continuously toward the extending direction of the winding slot at a portion stored in one winding slot, and the strand conductors 5 are short-circuited at the ends of the armature winding 2 which protrude outward from the sides of the stator core.

Herein, the space factor is the net ratio to the entire core, and the net used herein is the core itself excluding ventilating ducts, insulating materials formed on the surface of iron plates which is laminated and configure the stator core.

With regard to the strand conductors, in order to reduce circulating current loss by unbalanced voltage arising from leakage magnetic fluxes at end portions, the transposition angle thereof may be increased or decreased in the range from 360 degrees to 90 degrees. For simplicity, however, explanation will be made for 360-degree transposition in the invention.

Figure 1:
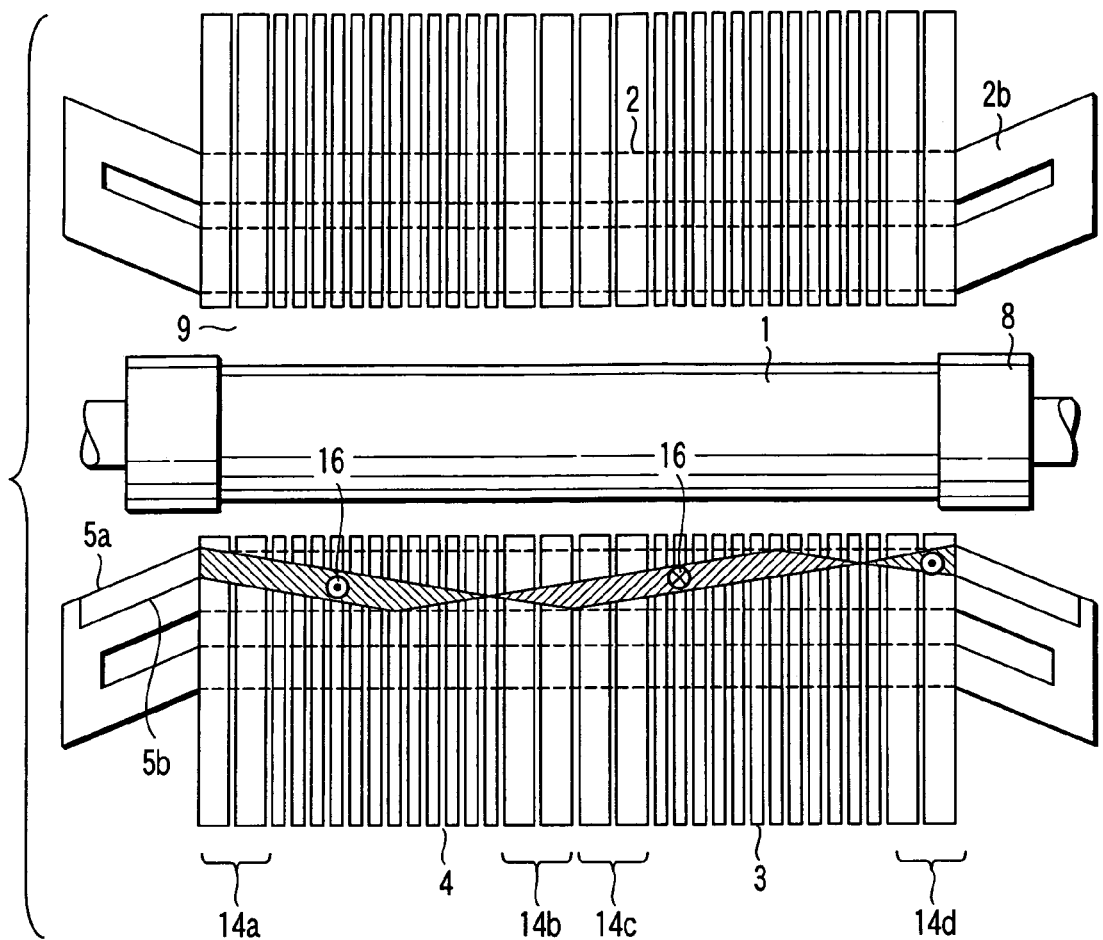
FIG. 1 is a basic structural diagram showing a rotary electro-dynamic machine according to a first embodiment of the invention.
Figure 2:
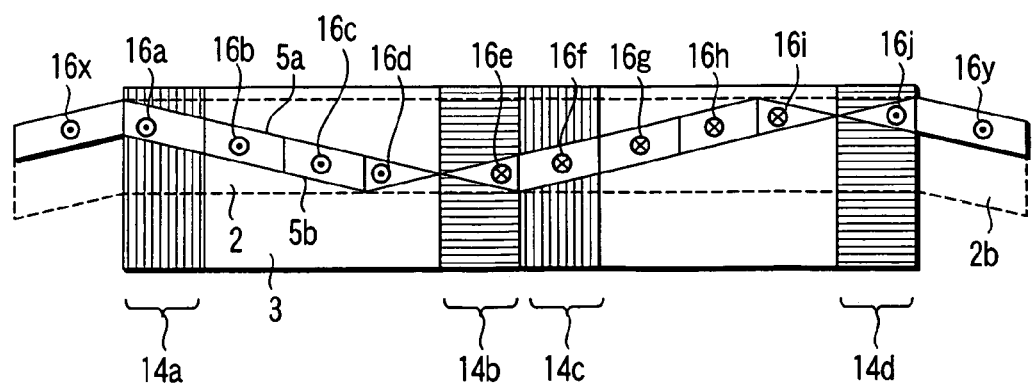
FIG. 2 is a basic structural diagram showing the rotary electro-dynamic machine according to the first embodiment of the invention.

FIG. 2 is a schematic diagram showing the lower half of the stator shown in FIG. 1, and the sub core sections 14 are divided into 4 portions 14a to 14d for the purpose of explanation. Among the armature windings, only the upper coil positioned at the inner diameter side of the stator is shown therein.

In the present embodiment configured as the above, current flows into the armature winding at load operation, and current flows into each strand conductor separately. FIGS. 1 and 2 show magnetic fluxes that cross between two representative strand conductors 5a and 5b, and in FIG. 2, crossing magnetic fluxes at the core section are designated by reference numerals 16a to 16j. If the crossing area of the crossing magnetic fluxes at the positions distant by the transposition angle of 180 degrees like, for example, the fluxes 16b and 16g are the same, and the space factors of the portions are the same, the unbalanced voltages of the portion due to crossing magnetic fluxes are offset. In the conventional electro-dynamic machine, for example, when the space factor of the portion corresponding to the flux 16a at the end portion is larger than the space factor of the portion corresponding to the flux 16f that is distant 180 degrees, the crossing magnetic flux 16a becomes larger than the flux 16f even if crossing areas are same, so that there occurs unbalanced voltage in strands due to the difference in crossing magnetic fluxes at this portion. In the same manner, there occurs unbalanced voltage also with the crossing magnetic fluxes 16e and 16j, and the crossing magnetic fluxes of 16a and 16j having large space factor becomes in the same direction, and therefore, unbalanced voltages are strengthened each other. In the embodiment, the space factors of the portions corresponding to fluxes 16e and 16f become same as those of fluxes 16a and 16j, so that fluxes 16a and 16f, and fluxes 16e and 16j offset each other.

In other words, the above-mentioned feature of the invention can be said that, when the range of the transposition angle of 180 degrees of strand conductors which becomes ½ of the core length in the embodiment is referred to as one core unit area, the configuration is made such that the space factor at each core unit area is of the same distribution to the transposition angle of strand conductors.

Figure 3:
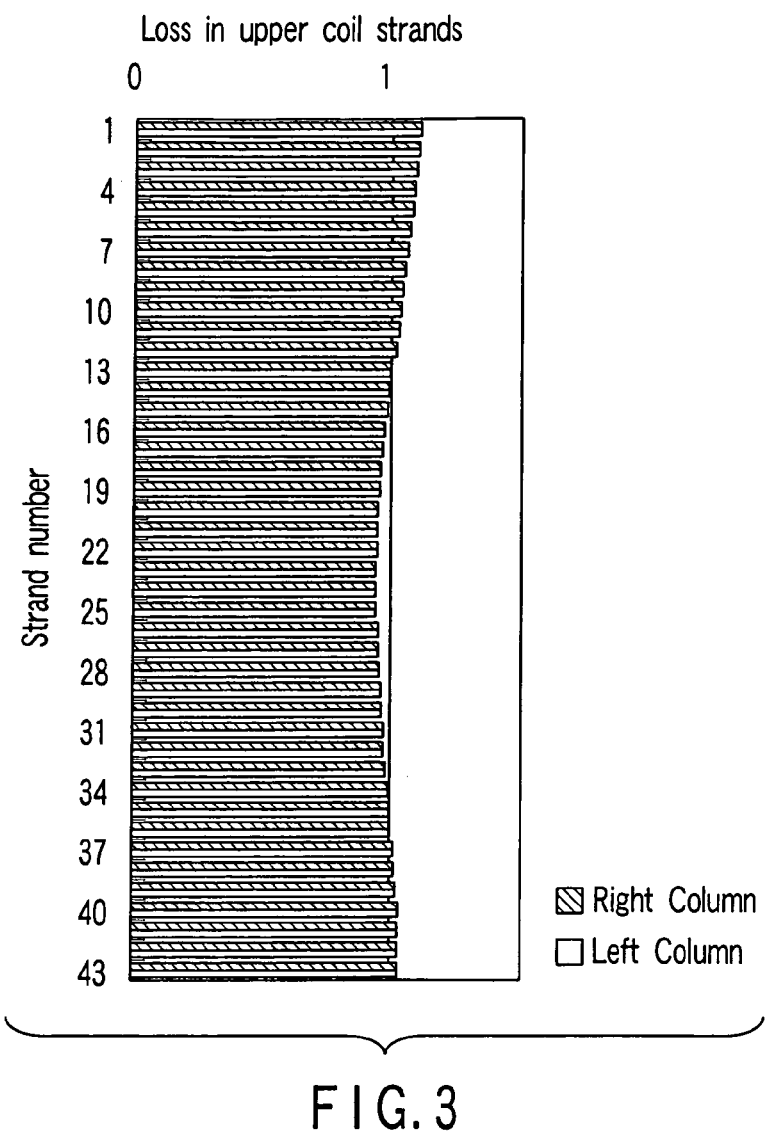
FIG. 3 is a numerical analysis result chart showing a loss distribution in strand conductors in the first embodiment of the invention.
Figure 4:
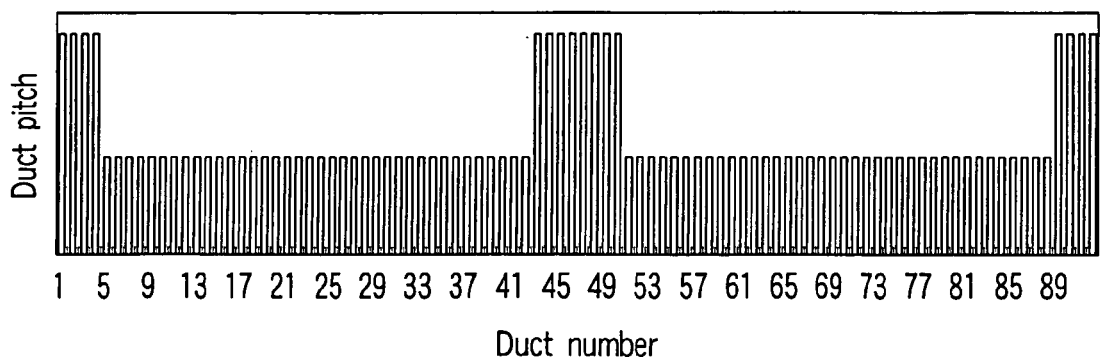
FIG. 4 is a distribution chart of the ventilating duct pitch in the numerical analysis in FIG. 3.

FIG. 3 shows an example of the results where a 360-degree transposition has been applied on a 150 MVA-class turbine power generator of the same capacity as that explained in the conventional example, and the loss distribution in strand conductors in the case of the ventilating duct pitch as shown in FIG. 4 has been obtained by numerical analysis. FIG. 3 shows that the loss distribution in strands is leveled in comparison with FIG. 51.

According to the embodiment, unbalanced voltage becomes small over the entire strand conductors of the core section, circulating currents can be retrained from occurring, and circulating current loss can be reduced. Therefore, it is possible to reduce the loss distribution in strands, and to suppress local heating of conductors of the armature winding.

Figure 5:
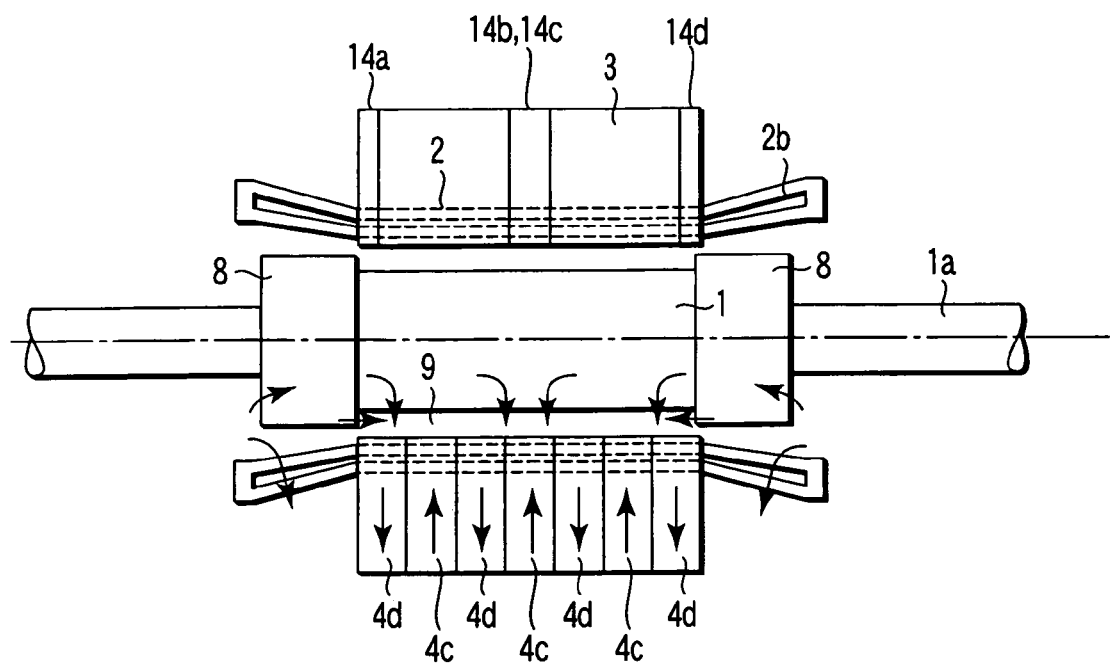
FIG. 5 is a basic structural diagram showing a ventilation structure of the rotary electro-dynamic machine according to the first embodiment of the invention.
Figure 46:
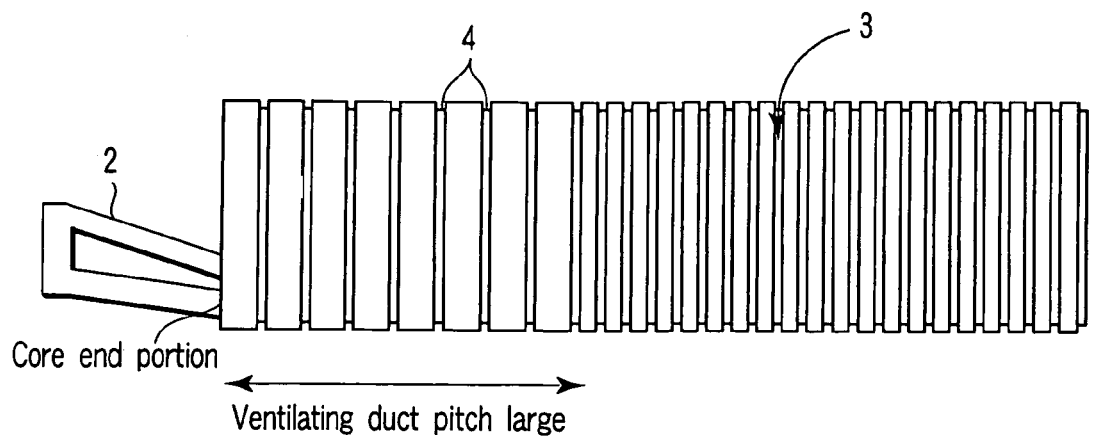
FIG. 46 is a basic structural diagram showing the prior art rotary electro-dynamic machine.

FIG. 5 shows a basic configuration of cooling gas ventilation routes in the present embodiment in its lower half portion, and a configuration of sub core sections 14 (14a to 14d) in its upper half portion. Note that the same functional components as those shown in FIG. 46 are denoted by the same reference numerals, and the duplicated description thereof is omitted. FIG. 5 is a configuration example where the stator core 3 is divided into three air supply sections 4c and four air exhaust sections 4d.

Cooling gas that flows from the end portion of the stator into the air gap 9 is supplied directly from the fans, and therefore, the gas temperature is low in comparison with other portions and advantageous for cooling. Accordingly, sub core sections 14a and 14d whose ventilation duct pitch at the core end portion side is large in comparison with other portions and whose space factor is large are arranged, and further, the sub core sections 14b and 14c arranged at the center in the axial direction are arranged in the air supply sections where gas temperature is low and advantageous for cooling, whereby the temperature distribution of the armature winding in the axial direction is leveled.

These effects are effective when the center portion of the core 3 in the axial direction becomes air supply sections, and it is possible to provide a rotary electro-dynamic machine that enables to suppress circulating current loss, and to cool the stator and the armature winding further preferably in the case when the number of ventilation sections is 4n−1 with n being an integer of 1 or more, i.e., 3, 7, 11 or so.

Figure 6:
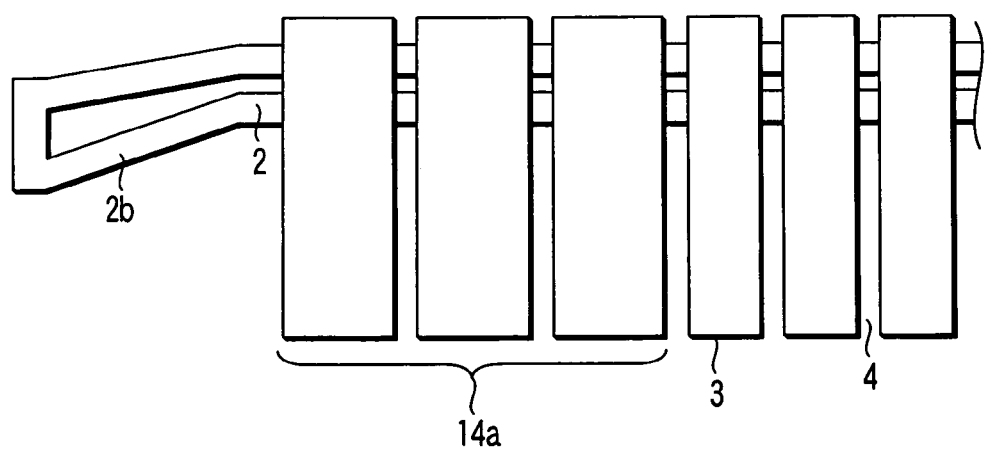
FIG. 6 is a basic structural diagram showing a stator core in the first embodiment of the invention.

In the embodiment, as shown in FIG. 6, the difference of the space factor is constituted by the difference of the duct pitch, namely the lamination thickness of laminated iron plates between ducts is changed. Since this makes it possible to make the duct width constant, the inside interval pieces can be constituted with the same structure, and at the same time, ventilation resistance between ventilating ducts can be made equal, and the control over wind amount distribution in ventilation sections becomes easy, so that it is possible to cool down the core and the coil further preferably.

Figure 7:
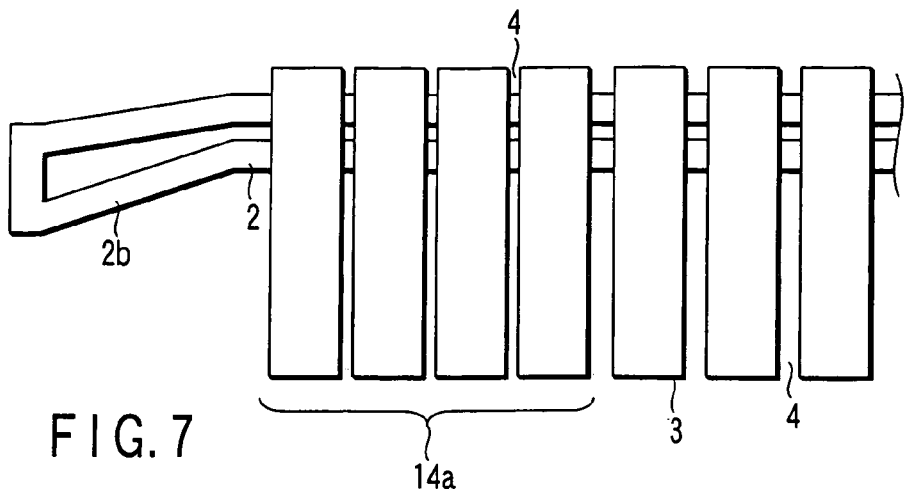
FIG. 7 is a basic structural diagram showing a stator core in a first modification of the first embodiment of the invention.

On the other hand, a modification of the first embodiment of the invention will be explained with reference to FIG. 7. FIG. 7 shows a configuration of the sub core sections and the ventilating ducts in the vicinity of the stator end portion. In the sub core section 14a where the space factor is larger than that of other portions, the width of the ventilating duct 4 in the sub core section 14a is narrow compared with that of the stator core 3. Because of such a configuration, lamination can be made without making large the thickness of the core section between the ventilating ducts, and consequently, the core can be efficiently cooled.

Figure 8:
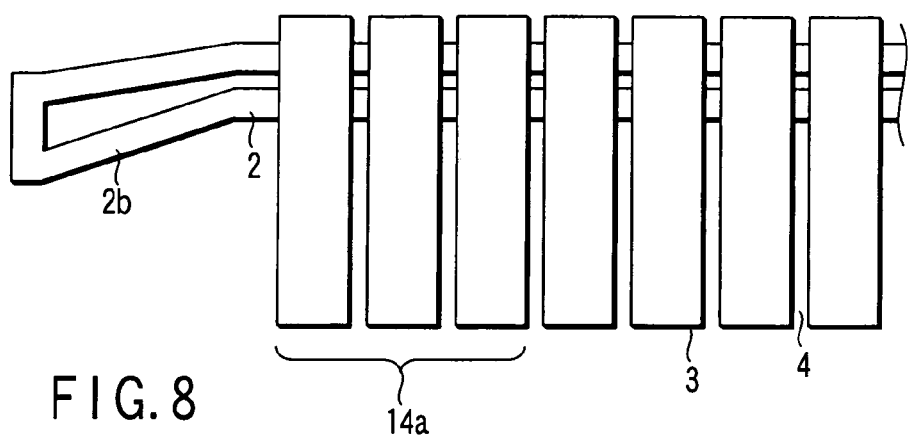
FIG. 8 is a basic structural diagram showing a stator core in a second modification of the first embodiment of the invention.
Figure 9:
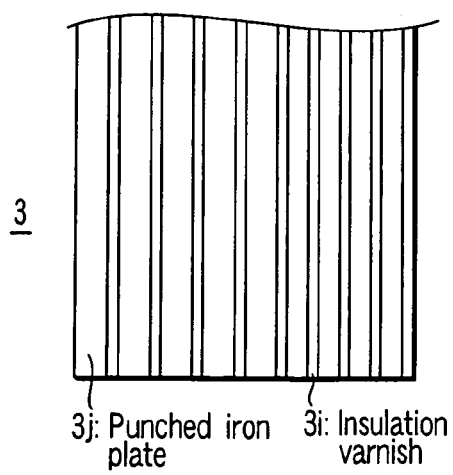
FIG. 9 is a basic structural diagram showing a punched iron plate core in the second modification of the first embodiment of the invention.

Further, a further modification of the first embodiment of the invention will be explained with reference to FIGS. 8 and 9. FIG. 8 shows a configuration of the sub core section 14a and the ventilating duct 4 in the vicinity of the stator end portion, and FIG. 9 shows an enlarged view of the core section. The stator core 3, as shown in FIG. 9, is normally made by applying an insulation film 3i such as insulation varnish onto the surface of a magnetic body as a punched iron plate 3j. In the modification of the first embodiment of the invention, the difference of the space factor is constituted by the difference in thickness ratio between the magnetic body which is the punched iron plate 3j configuring the stator core 3 and the insulation film 3i.

According to the rotary electro-dynamic machine of such a configuration, since the sub core section can be formed without changing the configuration of the ventilating duct, the degree of freedom in ventilation design increases, and further efficient ventilation is available. At the same time, if the thickness of the insulation film 3i is made constant, the portion of small space factor is constituted by a further thinner punched iron plate 3j, and the circulating current loss due to magnetic fluxes in the punched plate 3j surface at this portion can be made relatively small, so that it is possible to suppress a temperature increase.

Second Embodiment

Figure 10:
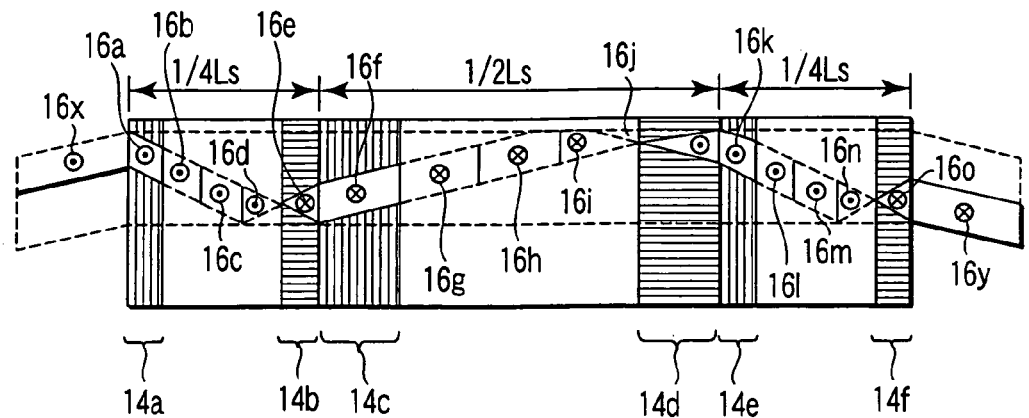
FIG. 10 is a basic structural diagram showing a rotary electro-dynamic machine according to a second embodiment of the invention.

Next, a second embodiment of a rotary electro-dynamic machine of the present invention will be explained with reference to FIGS. 10 to 12 hereinafter. The same functional components as those shown in the first embodiment are denoted by the same reference numerals, and the duplicated description thereof is omitted. In the embodiment, the strand conductors configuring the armature winding 2 in FIG. 10 are transposed by 540 degrees, and the transposition pitch in the range of ¼ of the core length from the end portions is a half of the center portion, namely, a 180-degree transposition is made respectively in the range of ¼ of the core length from the end portions and the range of ½ of the core length of the center portion. At the end portions of the stator core in the axial direction, sub core sections 14a and 14f whose space factor is larger than that of other stator core sections are arranged, and further, the sub core sections are arranged at the positions shown by sections 14c and 14e corresponding to the section 14a, and sections 14d and 14b corresponding to the section 14f such that the shape of the sub core sections are similar every range of the transfer each 180 degrees.

In the present embodiment configured as above, current flows into the armature winding at a loaded condition, and current flows into each strand conductor separately. In FIG. 10, magnetic fluxes that cross between two representative strand conductors are shown as the fluxes 16a to 16o in the core section. However, in other portion than the sub core, with regard to crossing magnetic fluxes at the positions distant by the transposition angle of 180 degrees like, for example, fluxes 16b, 16g and 16l, the sum of fluxes 16b and 16l becomes equal to the flux 16g, and therefore, the unbalanced voltages of the portion due to crossing magnetic fluxes are offset.

In the embodiment, also with regard to the sub core section whose space factor is large, the sum of the crossing magnetic fluxes 16a and 16k is equal to the flux 16f, and the sum of fluxes 16e and 16o is equal to the flux 16j, so that induced voltages are offset, and the occurrence of circulating currents is suppressed.

Figure 11:
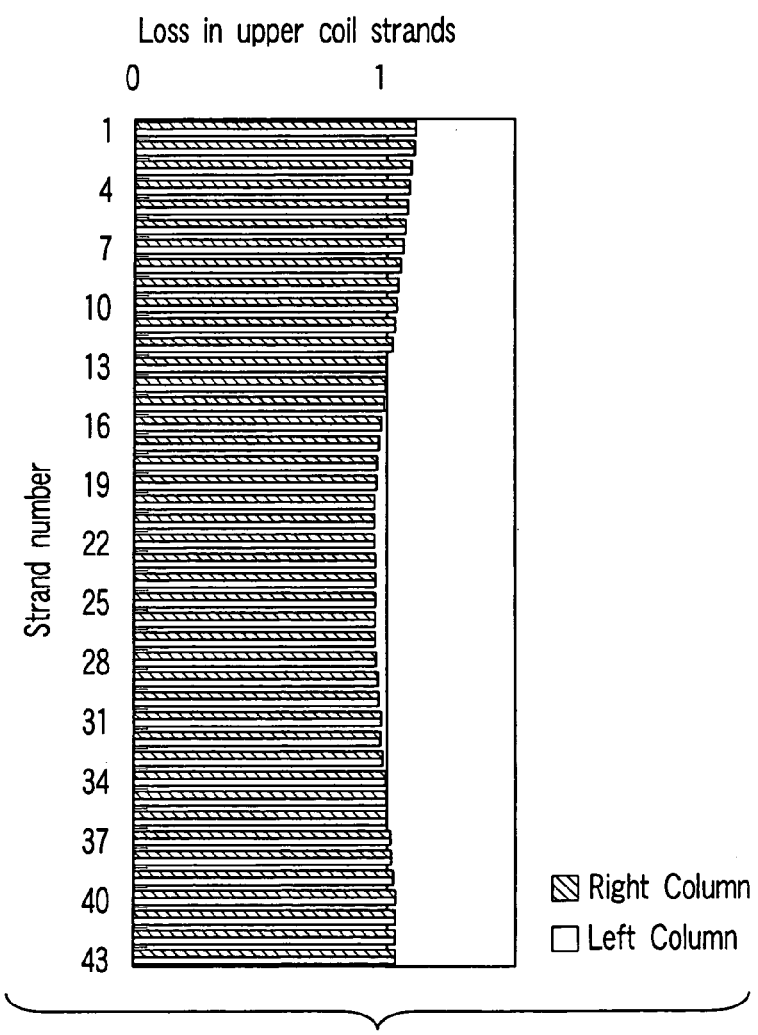
FIG. 11 is a numerical analysis result chart showing a loss distribution in strand conductors in the second embodiment of the invention.
Figure 12:
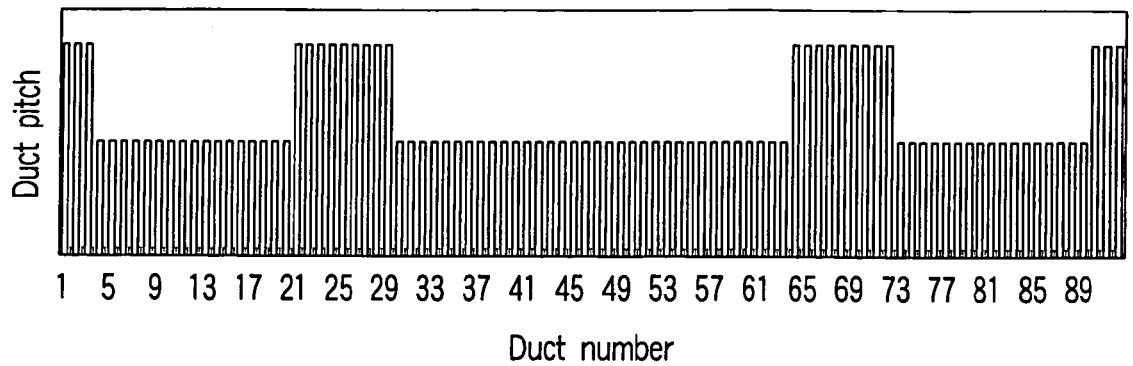
FIG. 12 is a distribution chart of ventilating duct pitched in the numerical analysis in FIG. 11.

FIG. 11 shows an example of the results where a 540-degree transposition has been applied on a turbine power generator of the same capacity as that shown in FIGS. 3 and 4, and the loss distribution in strand conductors in the case of ventilating duct pitch as shown in FIG. 12 has been obtained by numerical analysis. Explanations on the same points as in FIGS. 3 and 4 are omitted herein. In each area where the stator core is divided per transposition angle 180 degrees of the strand conductors, the sub core section 14 is arranged such that the shape of the sub core section 14 becomes similar, whereby the loss distribution in strands is leveled.

According to the embodiment, unbalanced voltage becomes small over the entire strand conductors of the core section, the occurrence of circulating currents is suppressed, and circulating current loss can be reduced. As a consequence, it is possible to reduce the loss distribution in strands, and to suppress local heating of conductors of the armature winding.

Figure 13:
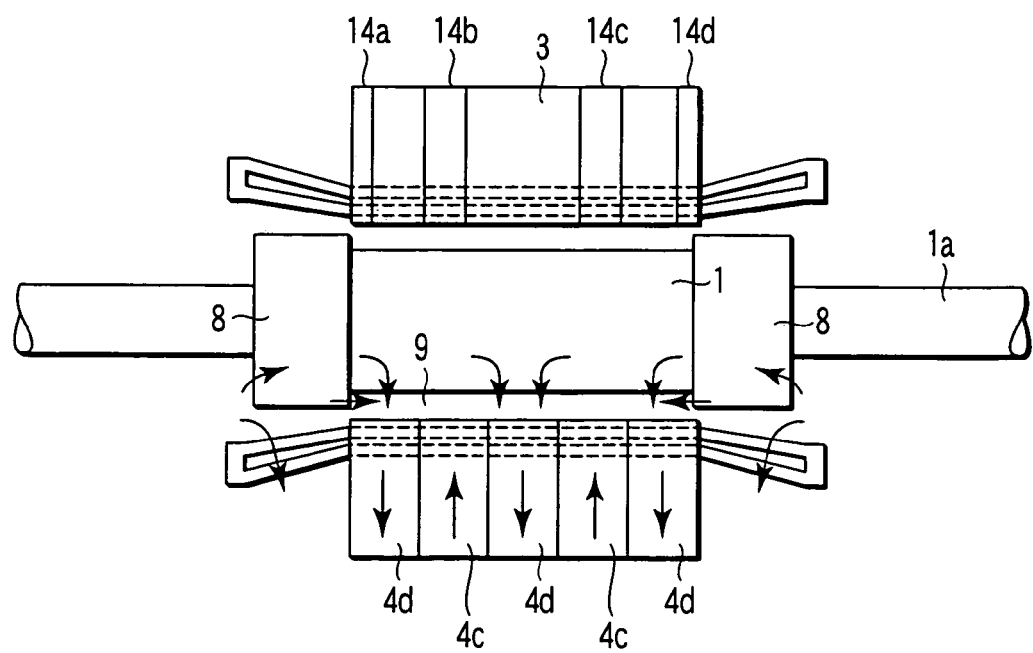
FIG. 13 is a basic structural diagram showing a ventilation structure of the rotary electro-dynamic machine according to the second embodiment of the invention.
Figure 45:
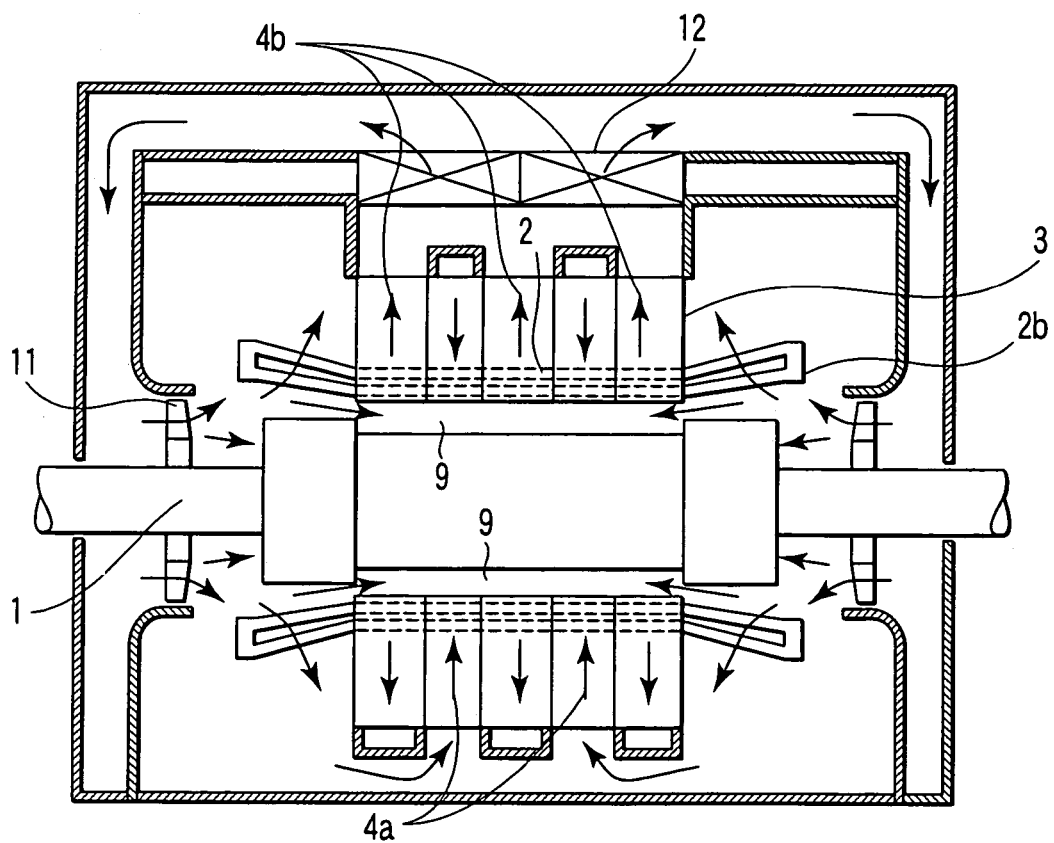
FIG. 45 is a basic structural diagram showing the prior art rotary electro-dynamic machine.

FIG. 13 shows a basic configuration of cooling gas ventilation routes in the embodiment in its lower half portion, and a configuration of sub core sections 14a, 14b, 14c, and 14d in its upper half portion. The same functional components as those shown in FIG. 45 are denoted by the same reference numerals, and the duplicated description thereof is omitted. FIG. 13, in the same manner as FIG. 46, is a configuration example in which the stator core 3 is divided into two air supply sections and three air exhaust sections.

With regard to the sub core section whose space factor is larger than that of other portions, the sub core section of other portion than the core end portion is arranged in the air supply sections where gas temperature is low in comparison with other portions and advantageous for cooling, so that the temperature distribution of the armature winding in the axial direction is leveled.

Third Embodiment

Figure 14:
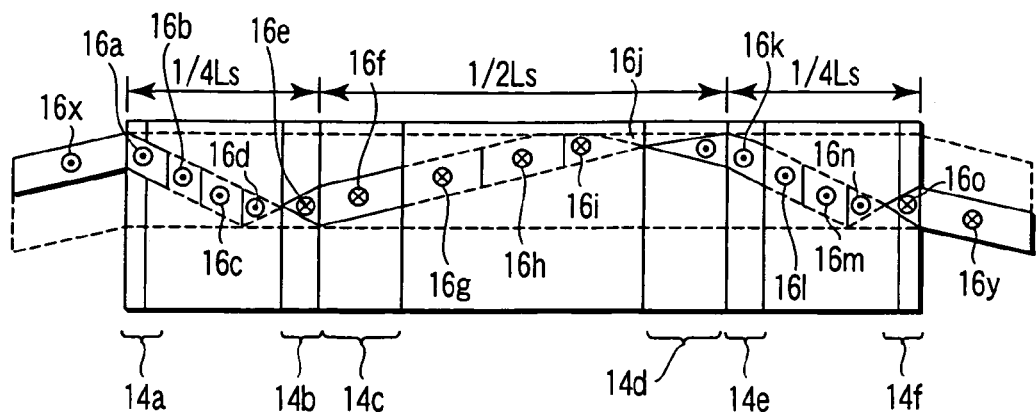
FIG. 14 is a basic structural diagram showing a rotary electro-dynamic machine according to a third embodiment of the invention.

Next, a third embodiment of a rotary electro-dynamic machine of the present invention will be explained with reference to FIGS. 14 to 16 hereinafter. Note that the same functional components as those shown in the first and second embodiments are denoted by the same reference numerals, and the duplicated description thereof is omitted. In the third embodiment, the strand conductors configuring the armature winding 2 in FIG. 14 are transposed by 540 degrees in the same manner as in FIG. 10. At the end portions of the stator core 3 in the axial direction, sub core sections 14a and 14f whose space factor is larger than that of other stator core sections are arranged, further, the sub core section 14 is arranged at the positions shown by the core sections 14c and 14e corresponding to the core section 14a, and core sections 14d and 14b corresponding to the core section 14f such that the shape of the sub core section 14 is arranged at the ends every range of the transfer each 180 degrees. The space factor f2 of the sub core sections 14b to 14e is almost the intermediate value of the space factor f1 of the sub core sections 14a to 14f, and the space factor f0 of other portions than the sub core section, namely $$f2 \cong \frac{1}{2}(f0+f1)$$

and the number of core packets of the sub core sections 14a and 14f is Np, 2 Np at sections 14b and 14e, and 4 Np at sections 14c and 14d.

In this manner, assuming that the number of packets 2 Np in the core unit area in the range of ¼ of the core length at the end portions in the axial direction, and the number of packets 4 Np in the core unit area in the range of ½ of the core length at the center portion in the axial direction are made as the length of the sub core section in the axial direction, the average space factors at the respective sub core sections become substantially equal to one another.

In the present embodiment configured as above, current flows into the armature winding in a loaded condition, and current flows into each strand conductor separately. In the embodiment, also with regard to the sub core section whose space factor is large, the sum of the crossing magnetic fluxes 16a and 16k offsets the flux 16f, and the sum of fluxes 16e and 16o offsets the flux 16j, so that the induced voltage is reduced, and the occurrence of circulating currents is suppressed. Although, in the embodiment, corresponding sub core sections are not completely similar as in the second embodiment, the average space factors of mutually corresponding sub core sections are made similar, thereby effects to offset unbalanced voltage are obtained.

Figure 15:
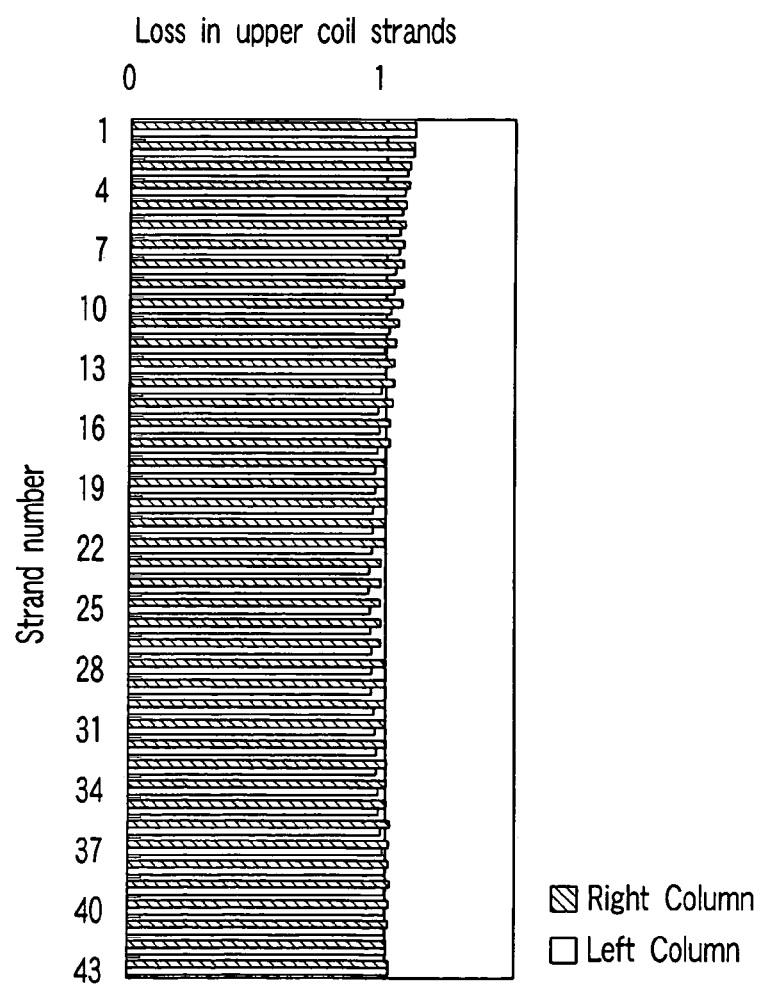
FIG. 15 is a numerical analysis result chart showing a loss distribution in strand conductors in the third embodiment of the invention.
Figure 16:
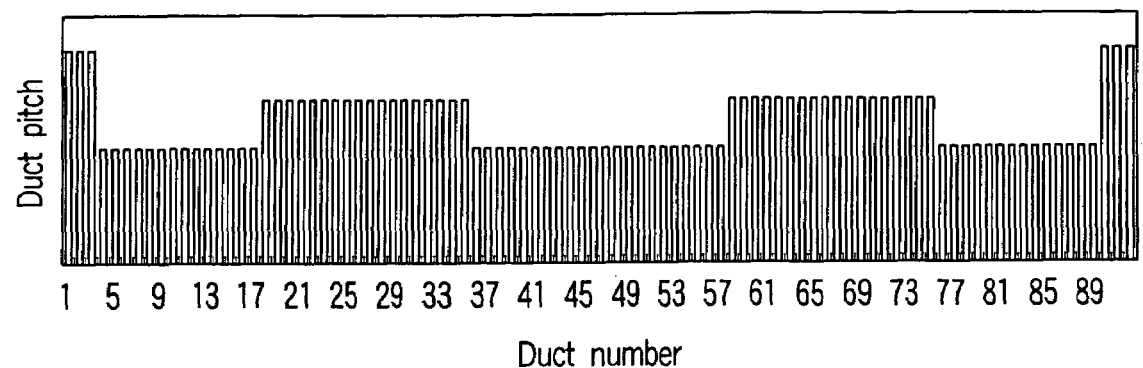
FIG. 16 is a distribution chart of the ventilating duct pitch in the numerical analysis in FIG. 15.

FIG. 15 shows an example of the results where a 540-degree transposition has been applied on a turbine power generator of the same capacity as that shown in the first and second embodiments, and the loss distribution in strand conductors in the case of ventilating duct pitch as shown in FIG. 16 has been obtained by numerical analysis. Explanations on the same points as in FIGS. 3 and 4, 11 and 12 are omitted herein. When the duct pitch of other portions than the sub core section 14 is set to 1, the duct pitch of the sub core section of the end portions of the stator core corresponding to sub core sections 14a and 14f in FIG. 14 is 1.86, and the number of core packets is 3 respectively. The duct pitch of the sub core sections corresponding to those 14b and 14e in FIG. 14 is 1.43, and the number of core packets is 6. The duct pitch of the sub core sections corresponding to those 14c and 14d in FIG. 14 is 1.43, and the number of packets is 12. As shown in FIG. 15, it is known that the loss distribution in strands is leveled.

According to the embodiment, unbalanced voltage becomes small over the entire strand conductors of the core section, the occurrence of circulating currents is suppressed, and circulating current loss can be reduced. As a consequence, it is possible to reduce the loss distribution in strands, and to suppress local heating of conductors of the armature winding.

Fourth Embodiment

Figure 17:
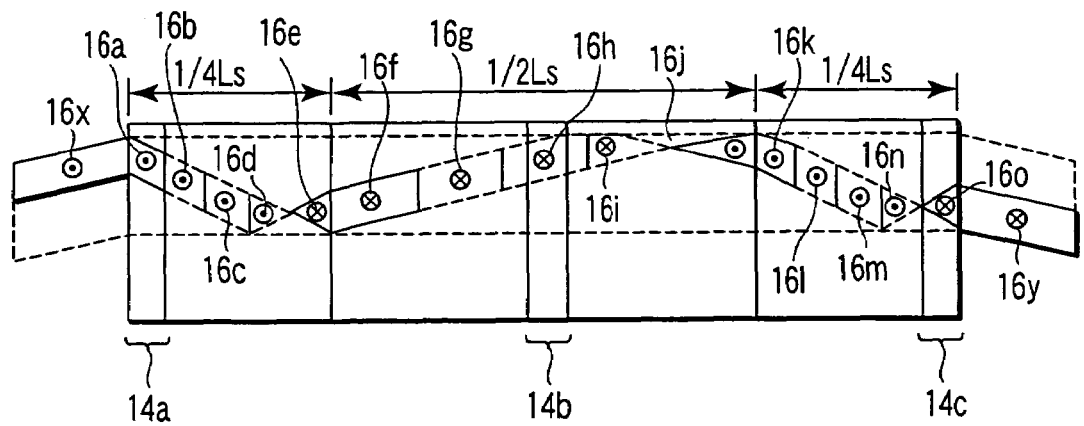
FIG. 17 is a basic structural diagram showing a rotary electro-dynamic machine according to a fourth embodiment of the invention.
Figure 18:
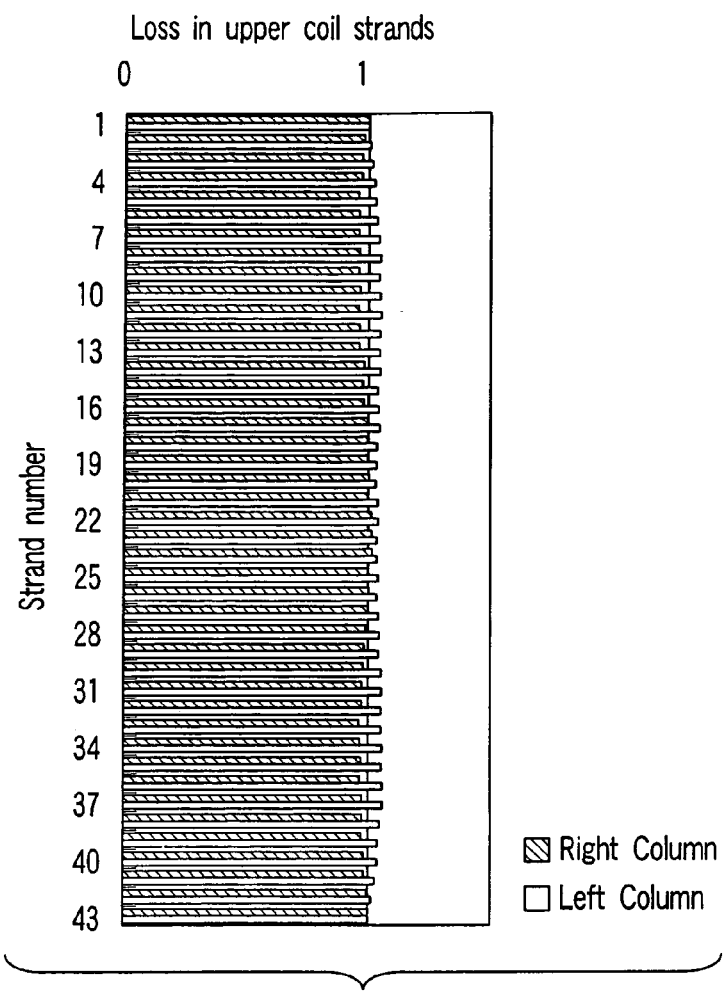
FIG. 18 is a numerical analysis result chart showing a loss distribution in strand conductors in the fourth embodiment of the invention.
Figure 19:
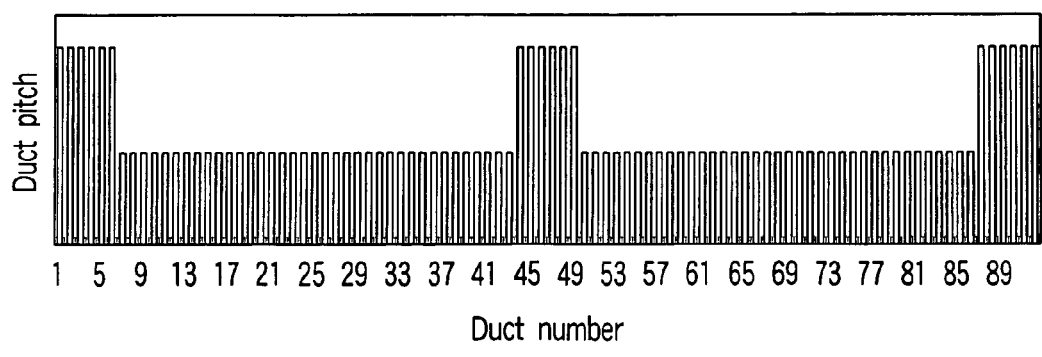
FIG. 19 is a distribution chart of the ventilating duct pitch in the numerical analysis in FIG. 18.

Next, a fourth embodiment of a rotary electro-dynamic machine of the present invention will be explained with reference to FIGS. 17 to 19 hereinafter. Note that the same functional components as those shown in the first to third embodiments are denoted by the same reference numerals, and the duplicated description thereof is omitted. In the fourth embodiment, the strand conductors configuring the armature winding 2 in FIG. 17 are transposed by 540 degrees in the same manner as in FIG. 10. At the end portions of the stator core in the axial direction, sub core sections 14a and 14c whose space factor is larger than that of other stator core sections are arranged, a further sub core section 14b is arranged at the center position in the axial direction, and the numbers of core packets in respective sub core sections are the same. FIG. 18 shows the loss distribution in strands by the same numerical analysis as shown in the first to third embodiments, and FIG. 19 shows the distribution of duct pitch at that moment.

In the embodiment, it is known that, even if the sub core section in one core unit area corresponding to transposition pitch 180 degrees is not always of the same shape, the sub core section 14b has an effect to offset unbalanced voltage occurring at the sections 14a and 14c and to suppress circulating currents. It is possible to make the number of sub core sections small to simplify the manufacture, and to increase the degree of freedom in ventilation balance design.

Fifth Embodiment

Figure 20:
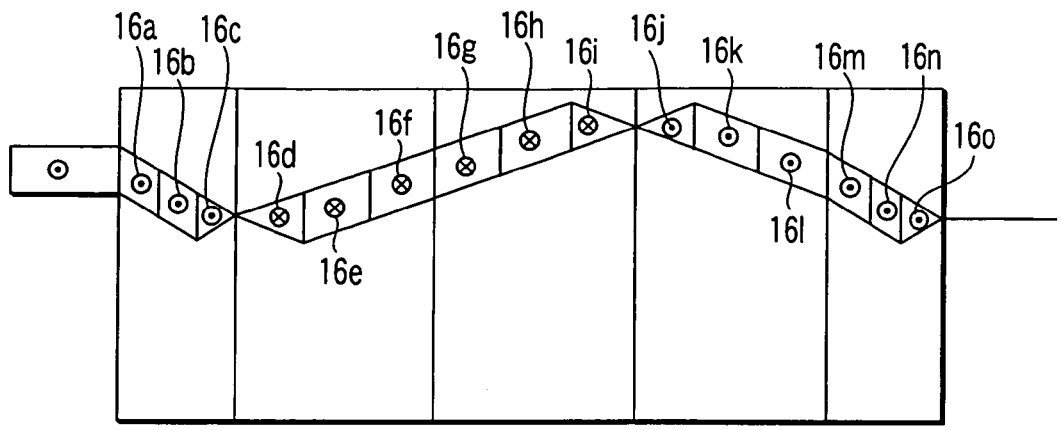
FIG. 20 is a basic structural diagram showing a rotary electro-dynamic machine according to a fifth embodiment of the invention.

Next, a fifth embodiment of a rotary electro-dynamic machine of the present invention will be explained with reference to FIG. 20 hereinafter. Note that the same functional components as those shown in the first to fourth embodiments are denoted by the same reference numerals, and the duplicated description thereof is omitted. In the fifth embodiment, the strand conductors configuring the armature winding 2 in FIG. 20 are transposed by 450 degrees. At the sub core section in the range of ⅛ of the core length at the end portions of the stator core in the axial direction, the transposition pitch becomes half, and at the same time, the stator space factor is larger or smaller than other stator core sections. Further, at the sub core section in the range of ¼ of the core length at the center portion in the axial direction, the space factor becomes same as that at the end portions.

In the present embodiment configured as above, the sum of the crossing magnetic fluxes 16a and 16m offsets the flux 16g, and in the same manner, the sum of the fluxes 16b and 16n offsets the flux 16h, and the sum of the fluxes 16c and 16o offsets the flux 16i. Therefore, unbalanced voltage is reduced, the occurrence of circulating currents is suppressed, and at the same time, also in the case of the entire transposition angle of 450 degrees, sub core sections can be configured only at the end portions and the center portion. Accordingly, in comparison with the case where the sub core section extends over four portions as shown in the second embodiment, ventilation design can be made more easily, and further, the number of times to switch the duct space factor during lamination of punched iron plates is small, so that manufacturing properties are also increased.

Sixth Embodiment

Figure 21:
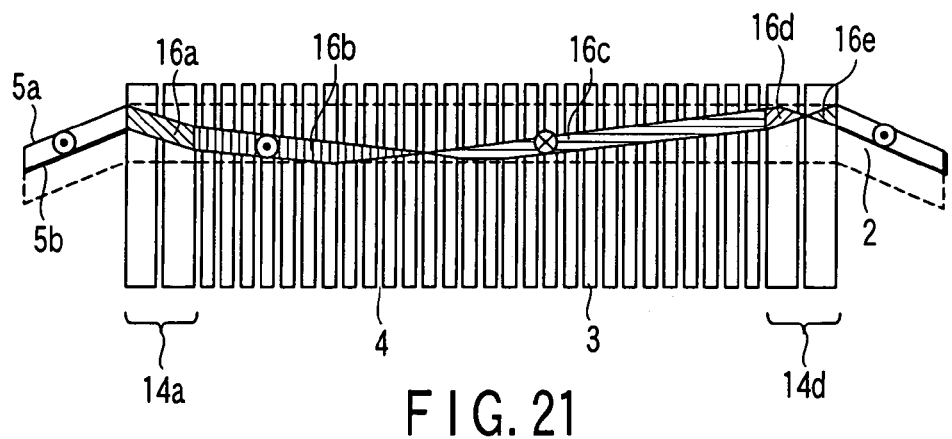
FIG. 21 is a basic structural diagram showing a rotary electro-dynamic machine according to a sixth embodiment of the invention.
Figure 22:
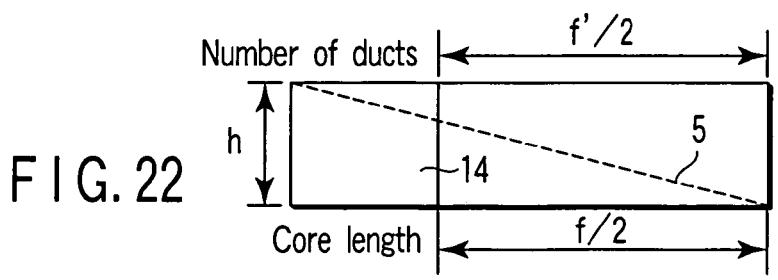
FIG. 22 is a schematic diagram showing one strand conductor in a prior art rotary electro-dynamic machine.

Next, a sixth embodiment of a rotary electro-dynamic machine of the present invention will be explained with reference to FIGS. 22 to 26 hereinafter. Note that the same functional components as those shown in the first to fifth embodiments are denoted by the same reference numerals, and the duplicated description thereof is omitted. In the embodiment, the strand conductors configuring the armature winding 2 in FIG. 21 are transposed by 360 degrees, and the sub core sections 14a, 14d whose space factor is different from those at other portions are arranged at the core end portions. In FIG. 22, magnetic fluxes that cross between two representative strand conductors 5a and 5b are designated by reference numerals 16a to 16e. The transposition pitch of the strand conductors in the sub core sections 14a and 14d is changed such that the crossing magnetic fluxes 16a and 16e offset each other, thereby to offset unbalanced voltage caused by the sub core sections.

Figure 23:
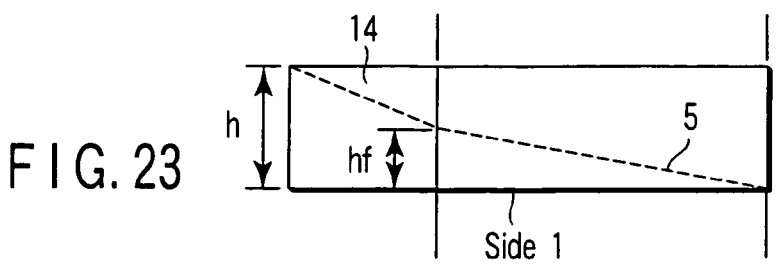
FIG. 23 is a schematic diagram showing one strand conductor in the sixth embodiment of the invention.

Herein, the most suitable transposition pitch of the strand conductors at the sub core sections 14a and 14d will be explained with reference to FIGS. 22 and 23 hereinafter. FIGS. 22 and 23 are schematic diagrams showing an example of strand conductors in the armature winding, wherein FIG. 22 shows a conventional case where the transposition pitch is uniform, and FIG. 23 shows a case according to the present embodiment. With transposition, the position of the strand conductors 5 shown by dotted line changes by only the coil height h in the range of transposition angle of 180 degrees. Since, in FIG. 22, the space factor of the sub core sections at the end portions is larger than those at other portions, there occurs unbalance in the strand voltage for the increase of crossing magnetic fluxes. On the contrary, by changing the pitch of strands such that the strands are at the height hf at the boarder between the sub core section 14 and other portion as shown in FIG. 23, unbalanced voltage is reduced.

Now, the crossing magnetic fluxes in the upper coil caused by the current in the lower coil is considered. As shown in the figure, it is assumed that the ratio of the length of the other portions than the sub core section to the stator core length Ls in the axial direction is f; the ratio of the number of ventilating ducts of the portions excluding the sub core section to the number of all the ventilating ducts N is f'; and the width of the ventilating ducts in the axial direction is d. If the ratio F of the transposition angle at which the strand conductors are twisted at the portions excluding the sub core section to the transposition angle (herein, 360 degrees) to minimize the unbalanced voltage in strands caused by magnetic fluxes crossing in strands in the core or between strands in the core and strands at the end portions of the core in the case where the stator space factor is uniform in the stator core, satisfies the following formula:

$$F = \frac{fL_S - f'Nd}{L_S - Nd}$$ [Equation 6]

it is possible to suppress the unbalanced voltage in the strands of the configuration as shown in the figure. In consideration of phase difference between the upper and lower coils and the upper coil current, it is difficult to offset the unbalanced voltage in all the strands. However, by reducing the unbalanced voltage to strands whose induced voltage is large, it is possible to suppress the entire circulating current loss. In an actual electro-dynamic machine, the transposition angle is determined discontinuously by the number of strands, and accordingly, a value near the F shown herein is taken.

In the present embodiment configured as above, the magnetic fluxes crossing in strands in the sub core section whose space factor is different from that of other portions, are substantially equal in amount to the magnetic fluxes in the case where the space factor is arranged evenly. Therefore, the unbalanced voltage in strands is reduced, and the occurrence of circulating currents can be suppressed.

Figure 24:
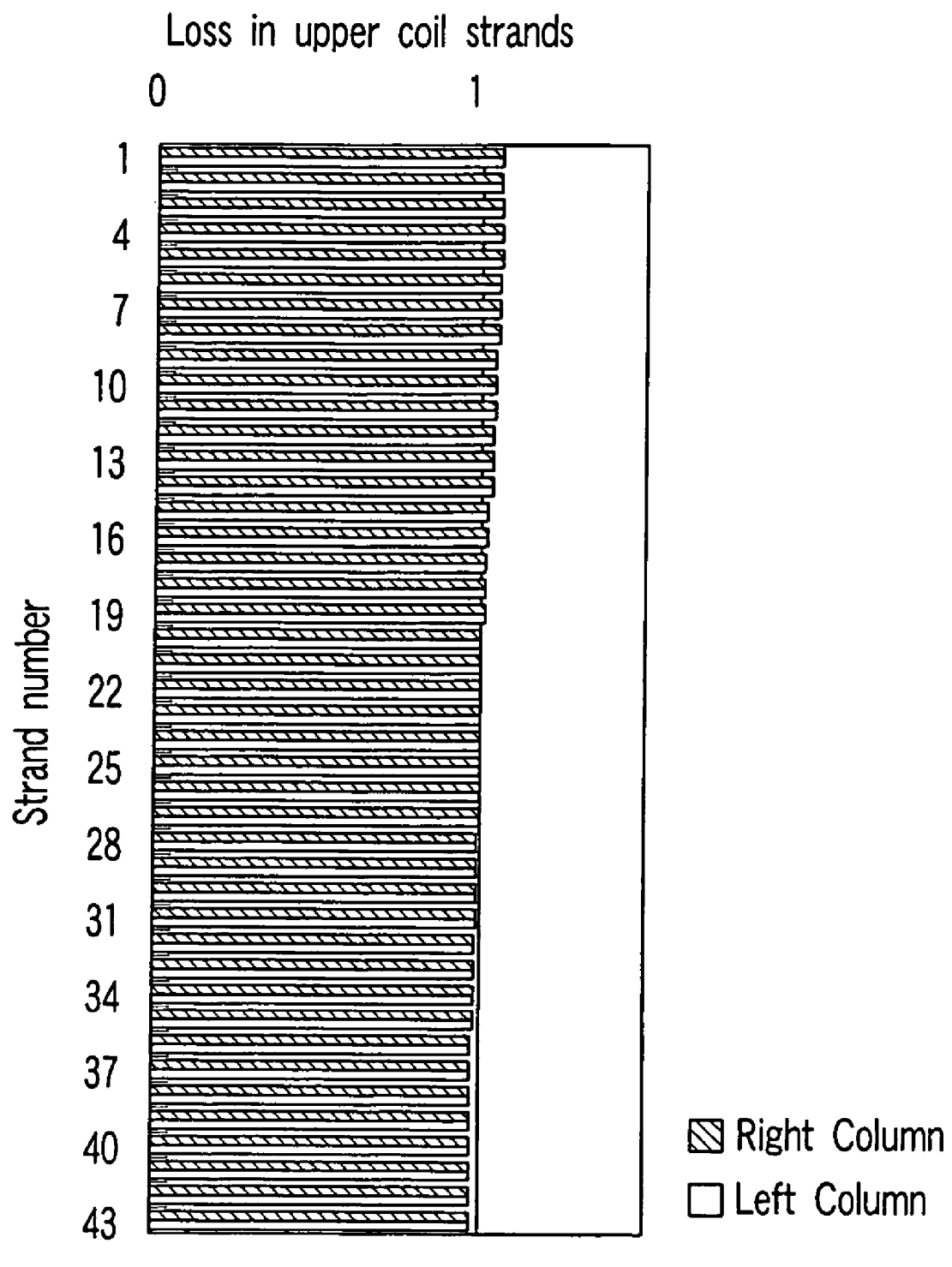
FIG. 24 is a numerical analysis result chart showing a loss distribution in strand conductors in the sixth embodiment of the invention.

FIG. 24 shows an example of the results where a 360-degree transposition has been applied on a turbine power generator of the same capacity as that shown in the first to fourth embodiments, and the loss distribution in strand conductors in the case of ventilating duct pitch as shown in FIG. 25 has been obtained by numerical analysis. Explanations on the same points in the already explained embodiments are omitted herein. As shown in FIG. 24, it is known that the loss distribution in strands is leveled.

Further, according to the present embodiment, sub core sections can be constituted only at the end portions. Consequently, in comparison with the case where the sub core section extends over three or more portions as shown in the fifth embodiment, ventilation design can be made more easily. Further, the number of times to switch the duct space factor during lamination of punched iron plates is small, and the inclination of the transposition can be made smoothly, so that manufacturing properties are also increased.

Furthermore, as one of modifications of the embodiment, the change of the transposition angle described in the embodiment may be applied to only the upper coil. This is because the circulating currents due to unbalanced voltage are higher in the upper coil than in the lower coil. By applying transposition according to the conventional example to the lower coil, easy manufacture can be made.

Seventh Embodiment

Next, a seventh embodiment of a rotary electro-dynamic machine of the present invention will be explained with reference to FIGS. 26 to 30 hereinafter. Note that the same functional components as those shown in the first to sixth embodiments are denoted by the same reference numerals, and the duplicated description thereof is omitted. In the seventh embodiment, in order to offset the unbalanced voltage caused by the sub core section 14 whose space factor is larger than that of other portions, the transposition angle of the strand conductors configuring the armature winding 2 in FIG. 26 is changed as below.

FIG. 27 is a schematic diagram showing one of strand conductors in the armature winding. Assuming that the axial length of the stator core is Ls; the ratio of the length of the other portions than the sub core section to the entire core length in the axial direction is f; the number of ventilating ducts is N; the width of the ventilating ducts in the axial direction is d; and the ratio of the number of ventilating ducts in the portions excluding the sub core section to the number of all the ventilating ducts is f', the following equation is satisfied.

$$\Delta F = \frac{Nd}{L_S - Nd}(f' - f) \qquad \text{[Equation 7]}$$

In this case, the ratio of the transposition angle of strand conductors in the stator core to the transposition angle (herein, 360 degrees for simplification) caused by magnetic fluxes crossing the unbalanced voltage in strands in the core or between strands in the core and strands in the end portions of the core in the case where the stator space factor is uniform in the stator core, satisfies the following equation:

$$F = \frac{1}{1 + \Delta F} \qquad \text{[Equation 8]}$$

Since, in an actual electro-dynamic machine, the transposition angle is determined discontinuously by the number of strands, a value near the F shown herein is taken.

In the present embodiment configured as above, voltage is induced in strands so as to offset the unbalanced voltage in strands that occurs in the sub core section whose space factor is different from that of other portions, so that the unbalanced voltage in strands is reduced, and the occurrence of circulating currents is suppressed.

Figure 28:
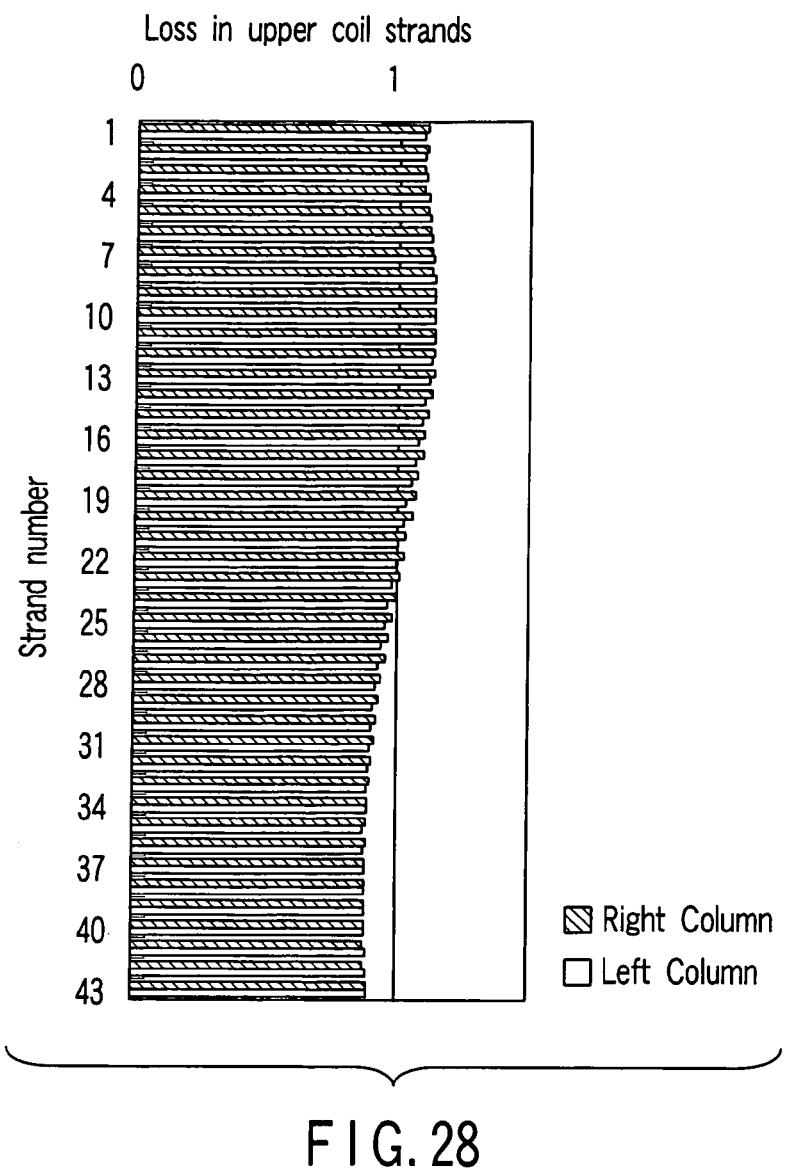
FIG. 28 is a numerical analysis result chart showing a loss distribution in strand conductors in the seventh embodiment of the invention.
Figure 29:
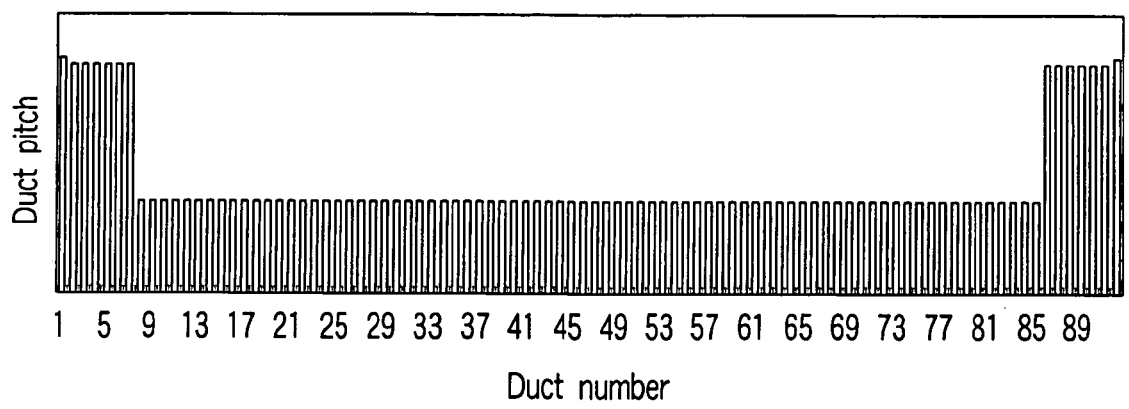
FIG. 29 is a distribution chart of the ventilating duct pitch in the numerical analysis in FIG. 28.
Figure 30:
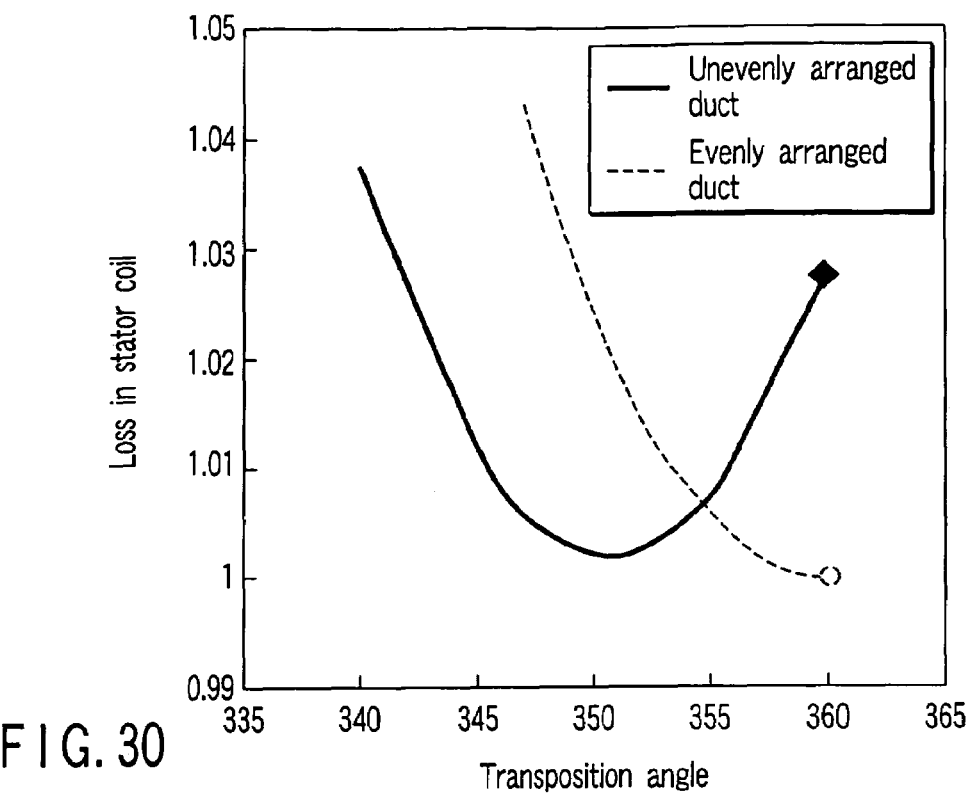
FIG. 30 is a numerical analysis result chart showing the relation between the strand loss and the transposition angle in the seventh embodiment of the invention.

FIG. 28 shows an example of the results where a 360-degree transposition has been applied on a turbine power generator of the same capacity as that shown in the first to fourth embodiments, and the loss distribution in strand conductors in the case of ventilating duct pitch as shown in FIG. 29 has been obtained by numerical analysis. Explanations on the same points in the above-described embodiments are omitted herein. As shown in FIG. 28, it is known that the loss distribution in strands is leveled. FIG. 30 shows the relation between the transposition angle and the loss in strands, and in the case of this analysis example, the loss is minimum around 350 degrees. In this example, the strands are arranged in two columns horizontally, and 43 stages vertically, and the transposition pitch becomes discontinuous every approximately 4 degrees from 360/(2*43). Thus, the loss becomes minimum at 351.6 degrees of the pitch reduced by two stages as shown in FIG. 30.

Further, according to the embodiment, the configuration of the sub core section can be made without modification. Therefore, in comparison with the case where the sub core section extends over three or more portions as shown in the first to fifth embodiments, ventilation design can be made more easily. Further, the number of times to switch the duct space factor during lamination of punched iron plates is small, so that it is also possible to increase manufacturing properties.

Furthermore, as one of modifications of the embodiment, the change of the transposition angle described in the embodiment may be applied to only the upper coil. This is because the circulating currents due to unbalanced voltage are higher in the upper coil than in the lower coil. By applying transposition according to the conventional example to the lower coil, easy manufacture can be made.

Eighth Embodiment

Figure 31:
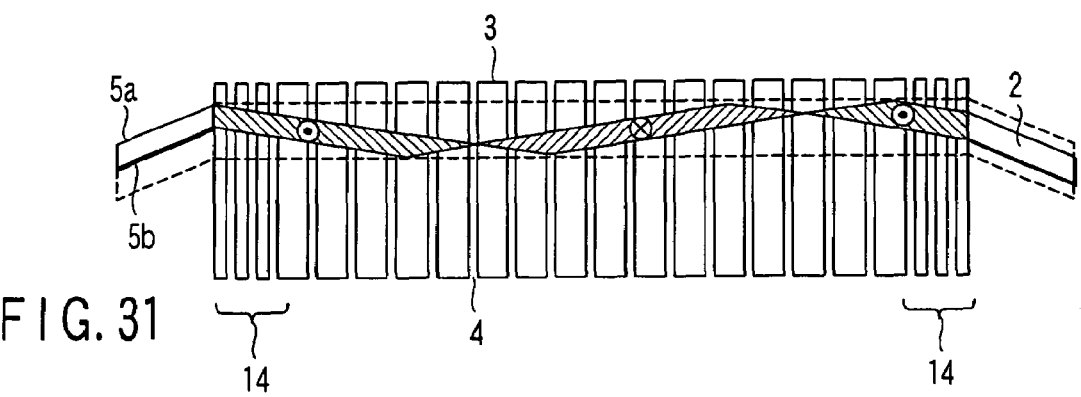
FIG. 31 is a basic structural diagram showing a rotary electro-dynamic machine according to an eighth embodiment of the invention.

Next, an eighth embodiment of a rotary electro-dynamic machine of the present invention will be explained with reference to FIGS. 31 to 35 hereinafter. Note that the same functional components as those shown in the first to seventh embodiments are denoted by the same reference numerals, and the duplicated description thereof is omitted. In the eighth embodiment, in order to offset the unbalanced voltage caused by the sub core section 14 whose space factor is smaller than that of other portions, the transposition angle of the strand conductors configuring the armature winding 2 in FIG. 31 is changed as below.

Figure 32:
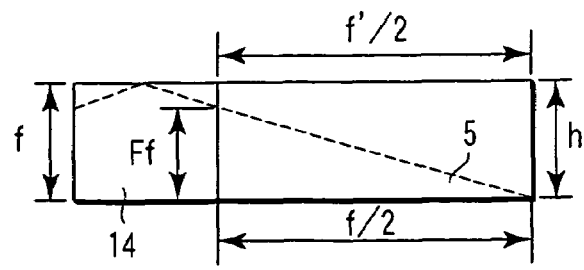
FIG. 32 is a schematic diagram showing one strand conductor in the eighth embodiment of the invention.

FIG. 32 is a schematic diagram showing one of strand conductors in the armature winding. Assuming that the axial length of the stator core is Ls; the ratio of the length of the other portions than the sub core section to the entire core length in the axial direction is f; the number of ventilating ducts is N; the width of ventilating ducts in the axial direction is d; and the ratio of the number of ventilating ducts in the portions excluding the sub core section to the number of all the ventilating ducts is f', the following equation is satisfied.

$$\Delta F = \frac{Nd}{L_S - Nd}(f' - f) \qquad \text{[Equation 9]}$$

In this case, the ratio of the transposition angle of strand conductors in the stator core to the transposition angle (herein, 360 degrees for simplification) to minimize the unbalanced voltage in strands caused by magnetic fluxes crossing in strands in the core or between strands in the core and strands at the end portions of the core in the case where the stator space factor is uniform in the stator core, satisfies the following equation.

$$F = 1 + \Delta F \qquad \text{[Equation 10]}$$

Since, in an actual electro-dynamic machine, the transposition angle is determined discontinuously by the number of strands, a value near the F shown herein is taken.

In the present embodiment configured as above, voltage is induced in strands so as to offset the unbalanced voltage in strands that occurs in the sub core section whose space factor is different from that of other portions. Therefore, the unbalanced voltage in strands is reduced, and the occurrence of circulating currents is suppressed.

Figure 33:
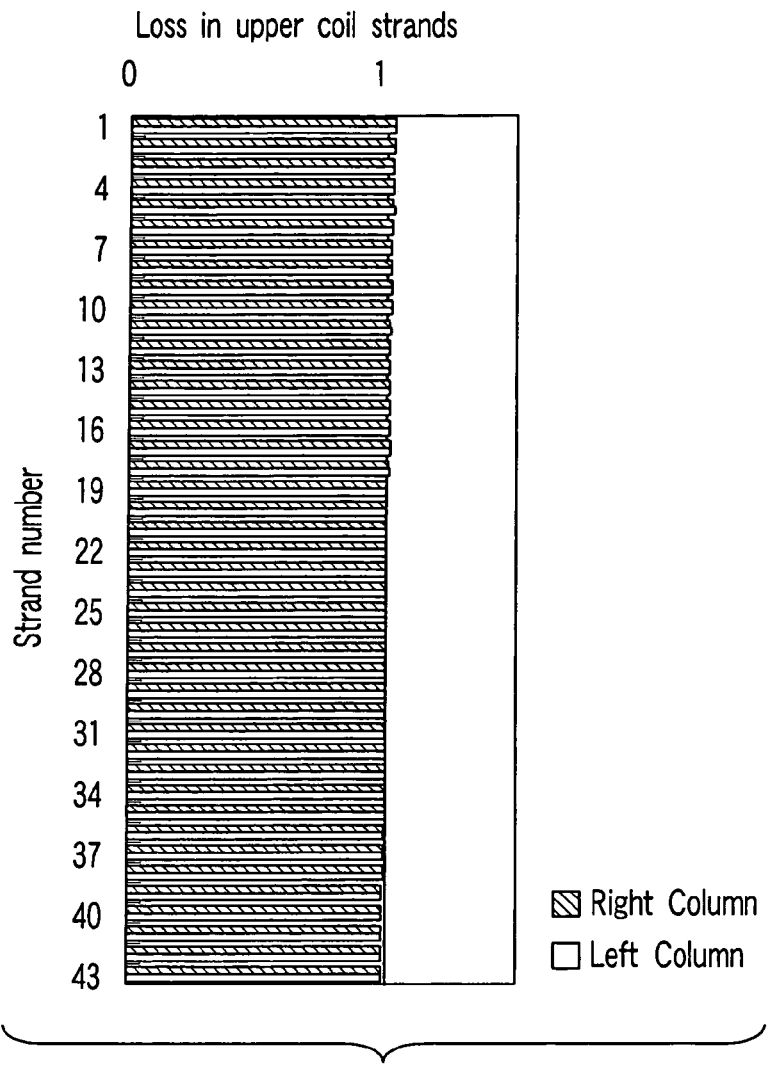
FIG. 33 is a numerical analysis result chart showing a loss distribution in strand conductors in the eighth embodiment of the invention.
Figure 34:
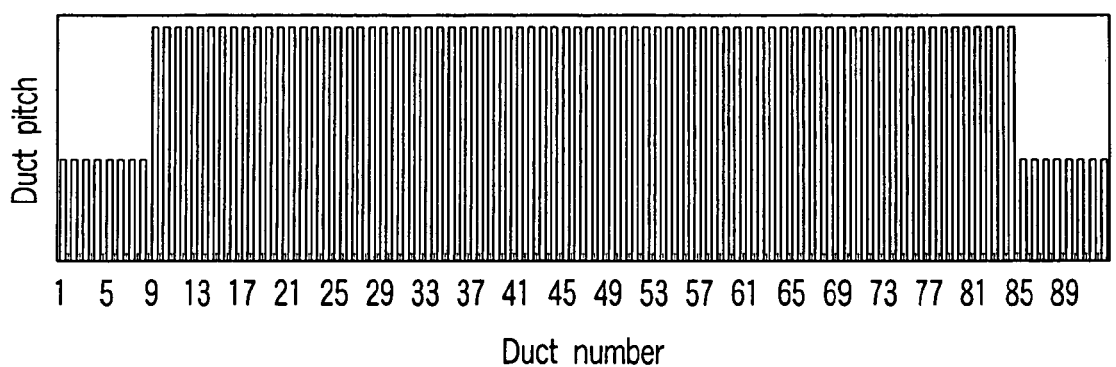
FIG. 34 is a distribution chart of the ventilating duct pitch in the numerical analysis in FIG. 33.
Figure 35:
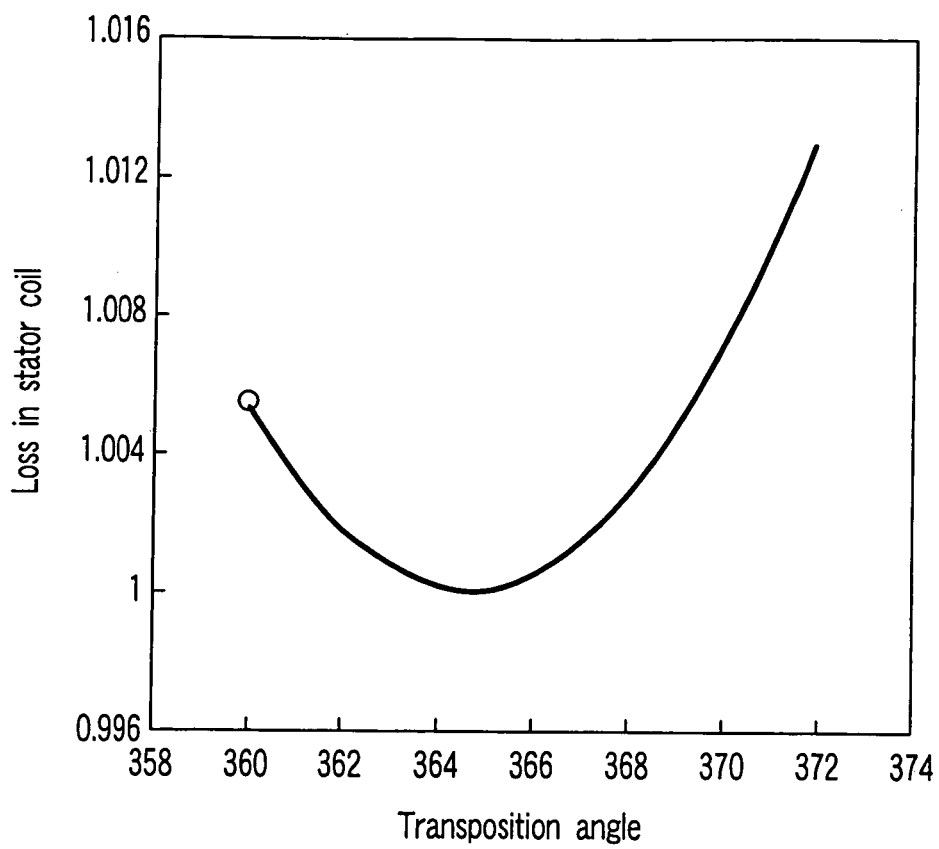
FIG. 35 is a numerical analysis result chart showing the relation between the strand loss and the transposition angle in the eighth embodiment of the invention.
Figure 36:
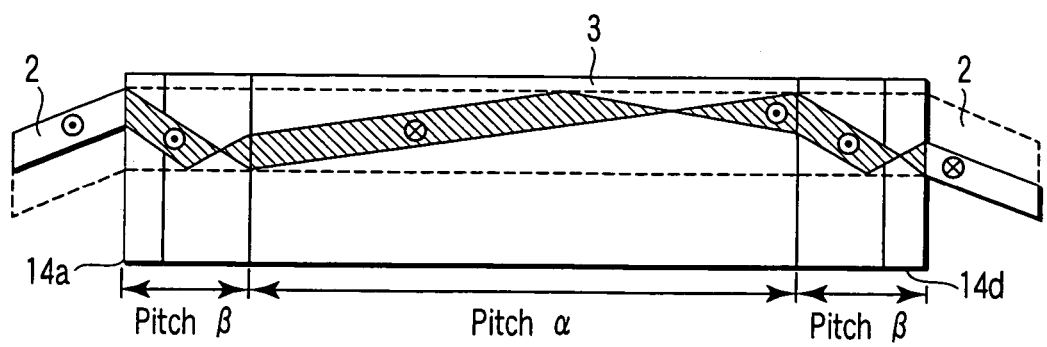
FIG. 36 is a basic structural diagram showing a rotary electro-dynamic machine according to a ninth embodiment of the invention.

FIG. 33 shows an example of the results where a 360-degree transposition has been applied on a turbine power generator of the same capacity as that shown in the first to fourth embodiments, and the loss distribution in strand conductors in the case of ventilating duct pitch as shown in FIG. 34 has been obtained by numerical analysis. Explanations on the same points in the above-described embodiments are omitted herein. As shown in FIG. 33, it is known that the loss distribution in strands is leveled. FIG. 35 shows the relation between the transposition angle and the loss in strands, and in the case of this analysis example, the loss is minimum around 365 degrees. In this example, the strands are arranged in two columns horizontally, and 43 stages vertically, and the transposition pitch becomes discontinuous every approximately 4 degrees from 360/(2*43). Thus, the loss becomes minimum at 364.3 degrees of the pitch exceeded by one stage.

Further, according to the embodiment, the configuration of the sub core section can be made without modification. Consequently, in comparison with the case where the sub core sections extend over three or more portions as shown in the first to fifth embodiments, ventilation design can be made more easily. Further, the number of times to switch the duct space factor during lamination of punched iron plates is small, and accordingly, it is also possible to increase manufacturing properties.

Furthermore, as one of modifications of the embodiment, the change of the transposition angle described in the embodiment may be applied to only the upper coil. This is because the circulating currents due to unbalanced voltage are higher in the upper coil than in the lower coil. By applying transposition according to the conventional example to the lower coil, easy manufacture can be made.

Ninth Embodiment

Next, a ninth embodiment of a rotary electro-dynamic machine of the present invention will be explained with reference to FIGS. 36 to 39 hereinafter. Note that the same functional components as those shown in the first to eighth embodiments are denoted by the same reference numerals, and the duplicated description thereof is omitted. In the ninth embodiment, the strand conductors configuring the armature winding 2 in FIG. 20 are transposed by 540 degrees. At the end portions of the stator core in the axial direction, the position of the inflection point to change the transposition pitch is shifted from the range of ¼ of the core length in the conventional example, whereby unbalanced voltages caused by the sub core sections 14a and 14d whose space factors are different, are offset.

In the present embodiment configured as above, with regard to strand conductors, the balance between the sum of the crossing magnetic fluxes at the portion where the pitch of the end portion area is short, and the sum of the crossing magnetic fluxes at the center area changes, and therefore, induced voltage becomes different from that in the case where the space factor is uniform. If the inflexion point is set at the position where the induced voltage offsets the unbalanced voltage generated by the sub core sections 14a and 14d, the unbalanced voltage over the entire strand conductors is reduced, and the occurrence of circulating currents is suppressed.

Figure 37:
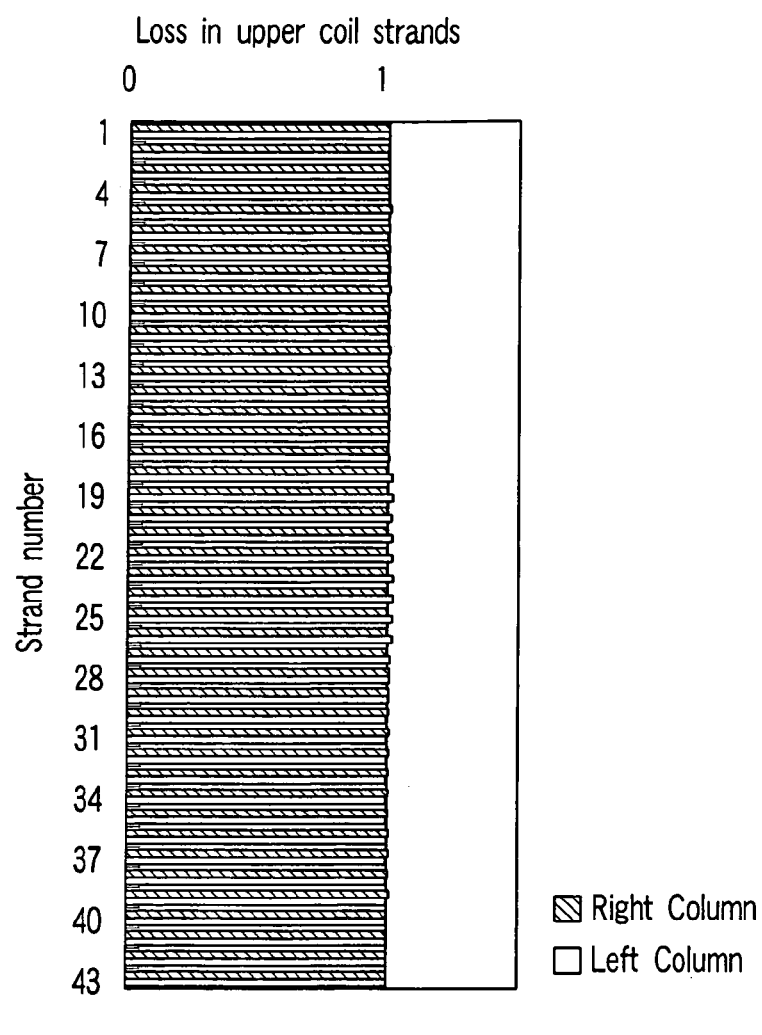
FIG. 37 is a numerical analysis result chart showing a loss distribution in strand conductors in the ninth embodiment of the invention.
Figure 38:
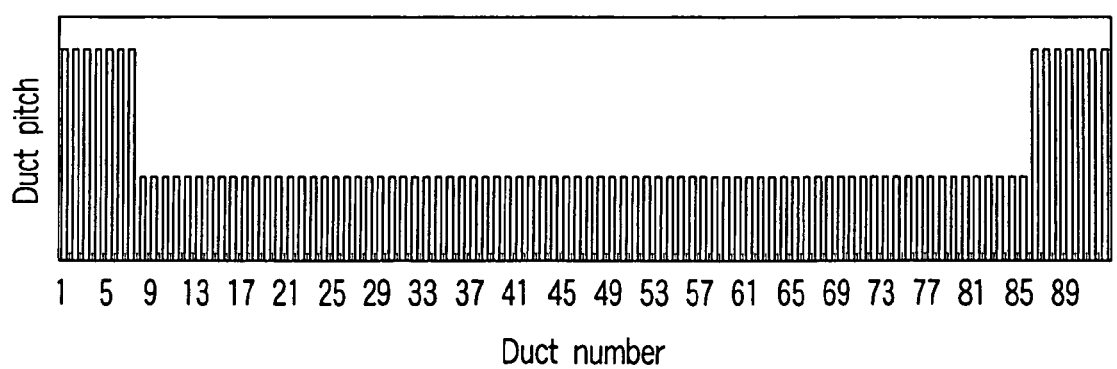
FIG. 38 is a distribution chart of the ventilating duct pitch in the numerical analysis in FIG. 37.
Figure 39:
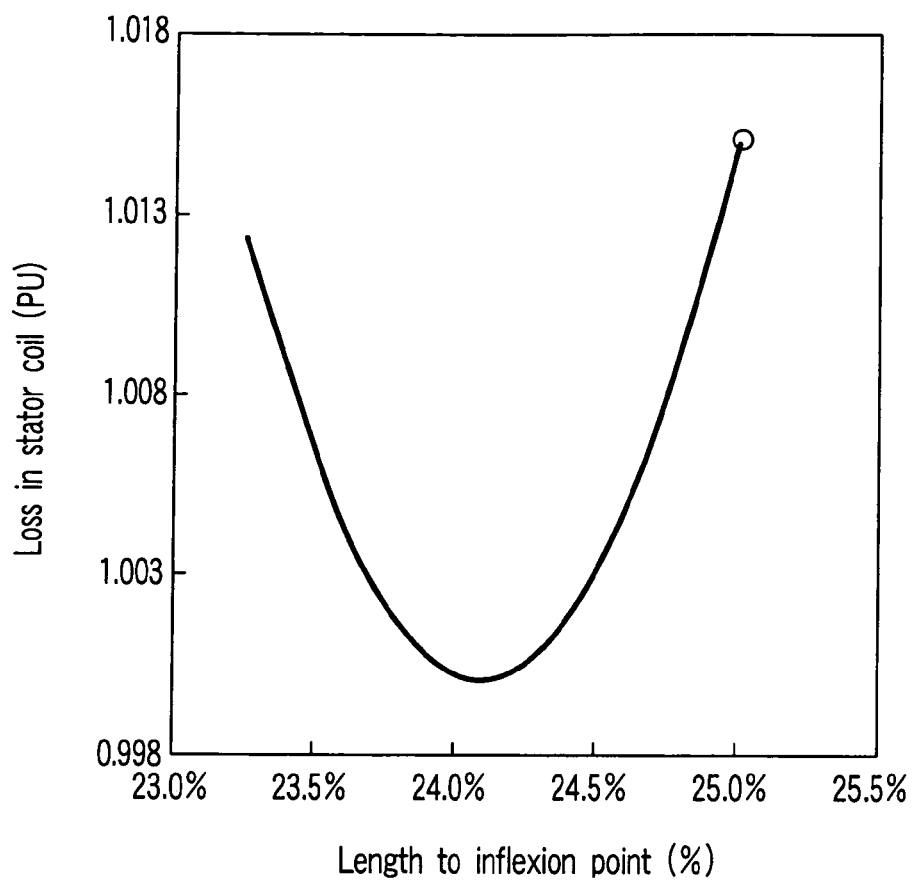
FIG. 39 is a numerical analysis result chart showing the relation between the strand loss and the length to an inflection point in the ninth embodiment of the invention.

FIG. 37 shows an example of the results where a 540-degree transposition has been applied on a turbine power generator of the same capacity as that shown in the first to fourth embodiments, and the loss distribution in strand conductors in the case of ventilating duct pitch as shown in FIG. 38 has been obtained by numerical analysis. Explanations on the same points in the above-described embodiments are omitted herein. As shown in FIG. 37, it is known that the loss distribution in strands is leveled. Further, FIG. 39 shows the relation between the core length to the inflexion point and the loss in strands, and in contrast to 25% of the conventional example of 540 degrees, the loss is minimum around 24%.

In the case of transposition angle 540 degrees, crossing magnetic fluxes do not offset at the end portion strand area if the entire transposition angle is changed from 540 degrees, so that there is a fear that the circulating current loss arising from the end portion magnetic field may increase. On the contrary, since the transposition angle of 540 degrees can be maintained in the embodiment, it is possible to reduce the circulating current loss due to unevenly arranged ducts without increasing the circulating current loss arising from the end portion magnetic field.

Furthermore, as one of modifications of the embodiment, the change of the transposition angle described in the embodiment may be applied to only the upper coil. This is because the circulating currents due to unbalanced voltage are higher in the upper coil than in the lower coil. By applying transposition according to the conventional example to the lower coil, easy manufacture can be made.

Tenth Embodiment

Next, a tenth embodiment of a rotary electro-dynamic machine of the present invention will be explained with reference to FIG. 40 hereinafter. Note that the same functional components as those shown in the first to ninth embodiments are denoted by the same reference numerals, and the duplicated description thereof is omitted. In the tenth embodiment, sub core sections 14a and 14d whose space factors are different are arranged at the end portions, the strand conductors configuring the armature winding 2 in FIG. 40 are transposed by 360 degrees, and a portion where transposition is not performed is arranged at the center portion of the stator core in the axial direction.

Figure 40:
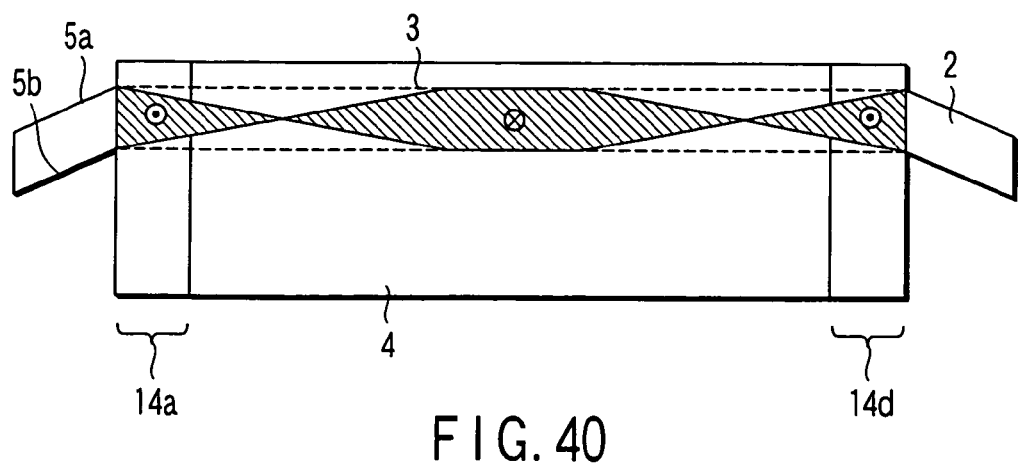
FIG. 40 is a basic structural diagram showing a rotary electro-dynamic machine according to a tenth embodiment of the invention.

In the present embodiment configured as above, the crossing magnetic flux at the center portion becomes larger than the sum of the crossing magnetic fluxes at the end portions in FIG. 40, and induced voltage becomes different from that in the case where the space factor is uniform. If the portion where transposition is not performed is arranged over an area where the induced voltage offsets the unbalanced voltage generated by the sub core section, the unbalanced voltage in the entire strand conductors is reduced, and the occurrence of circulating currents can be suppressed.

Figure 41:
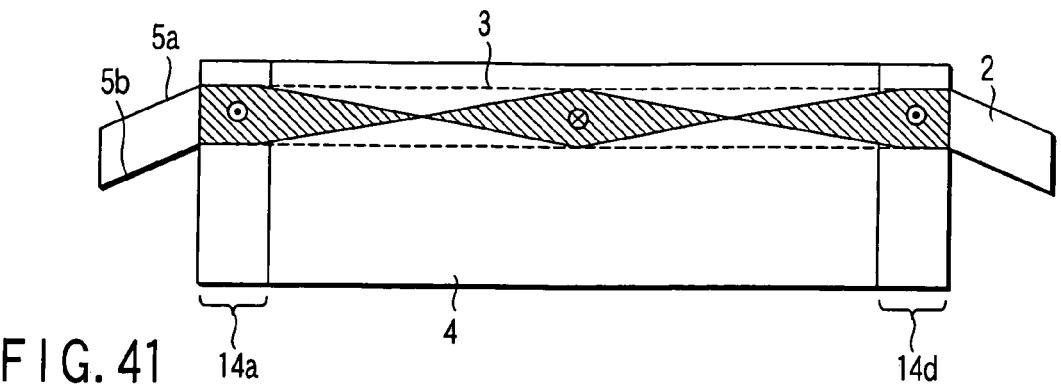
FIG. 41 is a basic structural diagram showing a modification of the tenth embodiment of the invention.

Further, a modification of the present embodiment is shown in FIG. 41. In this modification, a portion where transposition is not performed is arranged at the end portions of the core. Thereby, the crossing magnetic flux at the center portion becomes larger than the sum of the crossing fluxes at the end portions. In addition, if the portion where transposition is not performed is arranged over an area where the induced voltage offsets the unbalanced voltage generated by the sub core section generates, the unbalanced voltage in the entire strand conductors is reduced, and the occurrence of circulating currents can be suppressed.

Herein, the case where the transposition angle is 360 degrees has been explained. However, with regard to other transposition angles as well, the portion that is not transposed in the same manner, whereby the unbalanced voltage can be reduced, the occurrence of circulating currents can be suppressed, and further, the transposition angle can be maintained. Consequently, in the case where circulating current loss due to the end portion magnetic field is small as, for example, in a 540-degree transposition, it becomes possible to reduce the loss arising from unevenly arranged ducts without increasing the entire loss.

The present invention may be modified into other specific forms without departing from the gift thereof. Further, as many embodiments as possible may be combined appropriately, and in this case, combined effects can be attained. Furthermore, the above respective embodiments include various stages of invention, and various inventions may be extracted by appropriate combinations of plural structural elements disclosed herein. For example, when an invention is extracted by omitting some structural elements from the entire structural elements shown in the embodiments, those portions omitted are appropriately compensated by known commonly-used art in embodiment of the extracted invention.

What is claimed is:

1. An armature winding of a rotary electro-dynamic machine in which plural strand conductors which pile up respectively are stored in respective winding slots of a stator core comprising plural ventilating ducts in the radial direction and plural winding slots in the axial direction, the strand conductors being formed so as to be twisted and transposed continuously toward the extending direction of the winding slot at a portion stored in the winding slot, and the strand conductors being short-circuited at the ends of the armature winding which protrude outward from the sides of the stator core, wherein sub core sections whose duct factor of the ventilating ducts are different are arranged in part of the stator core, and the transposition angle of the strand conductors in the stator core is made different from the transposition angle to minimize the unbalanced voltage in the strands caused by magnetic fluxes crossing in the strands in the core or between the strands in the core and the strands at the end portions of the core when the stator space factor is uniform in the stator core, so as to offset the unbalanced voltage occurring in the strands due to the magnetic reluctance of the stator core, the magnetic reluctance being varied by the sub core section.

2. An armature winding of a rotary electro-dynamic machine according to claim 1, wherein the stator space factor in the sub core section is made smaller than that at other portions, and the transposition angle of the strand conductors in the stator core is made smaller than the transposition angle to minimize the unbalanced voltage in the strands caused by magnetic fluxes crossing in the strands in the core or between the strands in the core and the strands at the end portions of the core when the stator space factor is uniform in the stator core, so as to offset the unbalanced voltage caused by the sub core section.

3. An armature winding of a rotary electro-dynamic machine according to claim 2, wherein the transposition pitch of the strand conductors is approximately 360 degrees in the stator core or an angle transposed from 360 degrees so as to offset the unbalanced voltage occurring in the strand conductors; the axial length of the stator core is Ls; the ratio of the other portions than the sub core section to the entire core length in the axial direction is f; and the number of the ventilating ducts is N; the width of the ventilating ducts in the axial direction is d; and the ratio of the number of ventilating ducts in the portions excluding the sub core section to the number of all the ventilating ducts is f', the following equation is satisfied:

$$\Delta F = \frac{Nd}{L_S - Nd}(f' - f) \quad \text{[Equation 2]}$$

and in this case, the ratio of the transposition angle of the strand conductors in the stator core, to the transposition angle to minimize the unbalanced voltage in the strands caused by magnetic fluxes crossing in the strands in the core or between the strands in the core and the strands at the end portions of the core when the stator space factor is uniform in the stator core, is around:

$$F = \frac{1}{1 + \Delta F} \quad \text{[Equation 3]}$$

in the range of the inverse number of the number of strand stages.

4. An armature winding of a rotary electro-dynamic machine according to claim 1, wherein the stator space factor in the sub core section is made larger than that at other portions, and the transposition angle of the strand conductors in the stator core is made larger than the transposition angle to minimize the unbalanced voltage in the strands caused by magnetic fluxes crossing in the strands in the core or between the strands in the core and the strands at the end portions of the core when the stator space factor is uniform in the stator core, so as to offset the unbalanced voltage caused by the sub core section.

5. An armature winding of a rotary electro-dynamic machine according to claim 4, wherein the transposition pitch of the strand conductors is approximately 360 degrees in the stator core or an angle transposed from 360 degrees so as to offset the unbalanced voltage occurring in the strand conductors; the axial length of the stator core is Ls; the ratio of the other portions than the sub core section to the entire core length in the axial direction is f; the number of the ventilating ducts is N; the width of the ventilating ducts in the axial direction is d; and the ratio of the number of ventilating ducts in the portions excluding the sub core section to the number of all the ventilating ducts is f', the following equation is satisfied;

$$\Delta F = \frac{Nd}{L_s - Nd}(f' - f) \quad \text{[Equation 4]}$$

and in this case, the ratio of the transposition angle of the strand conductors in the stator core, to the transposition angle to minimize the unbalanced voltage in the strands caused by magnetic fluxes crossing in the strands in the core or between the strands in the core and the strands at the end portions of the core when the stator space factor is uniform in the stator core, is around:

$$F = 1 + \Delta F \quad \text{[Equation 5]}$$

in the range of the inverse number of the number of strand stages.

* * * * *